(12) United States Patent
Mouftah et al.

(10) Patent No.: US 10,949,843 B2
(45) Date of Patent: Mar. 16, 2021

(54) METHODS AND SYSTEMS FOR CONJUGATED AUTHENTICATION AND AUTHORIZATION

(71) Applicants: Hussein Talaat Mouftah, Ottawa (CA); Binod Vaidya, Ottawa (CA); Carlisle Adams, Ottawa (CA)

(72) Inventors: Hussein Talaat Mouftah, Ottawa (CA); Binod Vaidya, Ottawa (CA); Carlisle Adams, Ottawa (CA)

(73) Assignees: Hussein Talaat Mouftah, Ottawa (CA); Binod Vaidya, Ottawa (CA); Carlisle Adams, Ottawa (CA)

( * ) Notice: Subject to any disclaimer, the term of this patent is extended or adjusted under 35 U.S.C. 154(b) by 346 days.

(21) Appl. No.: 15/986,236

(22) Filed: May 22, 2018

(65) Prior Publication Data
US 2018/0336551 A1    Nov. 22, 2018

Related U.S. Application Data

(60) Provisional application No. 62/509,248, filed on May 22, 2017.

(51) Int. Cl.
*G06Q 20/38* (2012.01)
*G06F 21/60* (2013.01)
(Continued)

(52) U.S. Cl.
CPC ........... *G06Q 20/388* (2013.01); *G06F 21/34* (2013.01); *G06F 21/602* (2013.01);
(Continued)

(58) Field of Classification Search
CPC . H04L 2209/84; H04L 9/3213; H04L 9/3234; H04L 9/3247; H04L 9/0643;
(Continued)

(56) References Cited

U.S. PATENT DOCUMENTS 7,885,893 B2    2/2011  Alexander
8,102,248 B2    1/2012  Yasuda et al.
(Continued)

FOREIGN PATENT DOCUMENTS

CA    2764851    7/2012
CA    2769942    9/2012
(Continued)

OTHER PUBLICATIONS

International Standard ISO 15118-1, "Road Vehicles—Vehicle-to-Grid Communication Interface", Apr. 15, 2013, Switzerland.
(Continued)

*Primary Examiner* — Andrew Joseph Rudy
(74) *Attorney, Agent, or Firm* — IP-MEX Inc.; Victoria Donnelly

(57) ABSTRACT

Methods and systems for conjugated authentication and authorization are provided, where two entities are associated through the use of respective conjugated credentials. The credentials of the user and a respective vehicle are both generated in a method that cryptographically binds the two entities and their respective pieces of data together so that the binding of the two entities can be easily verified by a third party without the use of external databases.

20 Claims, 18 Drawing Sheets

(51) Int. Cl.

| | | |
|---|---|---|
| *H04L 9/06* | (2006.01) | |
| *G06Q 20/20* | (2012.01) | |
| *G06Q 50/06* | (2012.01) | |
| *G06Q 20/18* | (2012.01) | |
| *G06F 21/34* | (2013.01) | |
| *H04L 9/32* | (2006.01) | |
| *G06Q 20/14* | (2012.01) | |
| *G07F 15/00* | (2006.01) | |

(52) U.S. Cl.
CPC ......... *G06Q 20/145* (2013.01); *G06Q 20/18* (2013.01); *G06Q 20/202* (2013.01); *G06Q 20/206* (2013.01); *G06Q 50/06* (2013.01); *G07F 15/005* (2013.01); *H04L 9/0643* (2013.01); *H04L 9/3213* (2013.01); *H04L 9/3234* (2013.01); *H04L 9/3236* (2013.01); *H04L 9/3247* (2013.01); *H04L 2209/84* (2013.01)

(58) Field of Classification Search
CPC .... H04L 9/3236; G06Q 20/18; G06Q 20/145; G06Q 20/202; G06Q 20/388; G06Q 20/206; G06Q 50/06; G06F 21/602; G06F 21/34; G07F 15/005
USPC .......................................................... 705/21
See application file for complete search history.

(56) References Cited

U.S. PATENT DOCUMENTS

| | | | |
|---|---|---|---|
| 8,335,547 | B2 | 12/2012 | Otterson |
| 8,354,913 | B2 | 1/2013 | Solomon et al. |
| 8,417,598 | B2 | 4/2013 | Pinkusevich et al. |
| 8,421,592 | B1 | 4/2013 | Gunasekara et al. |
| 8,450,967 | B2 | 5/2013 | Lowenthal et al. |
| 8,452,661 | B2 | 5/2013 | Karch et al. |
| 8,498,763 | B2* | 7/2013 | Hafner ............... B60L 8/003 701/22 |
| 8,500,013 | B2 | 8/2013 | Acosta-Cazaubon et al. |
| 8,521,599 | B2* | 8/2013 | Rivers, Jr. ............... B60L 53/63 705/16 |
| 8,549,602 | B2 | 10/2013 | Vaeth |
| 8,565,950 | B2 | 10/2013 | Ishibashi |
| 8,624,549 | B2* | 1/2014 | Sridhar ............... H01M 8/0432 320/109 |
| 8,706,312 | B2 | 4/2014 | Littrell |
| 8,836,281 | B2* | 9/2014 | Ambrosio ............... G06Q 40/12 320/109 |
| 8,918,376 | B2* | 12/2014 | Ambrosio ............... B60L 53/64 707/694 |
| 8,935,112 | B2* | 1/2015 | Lowenthal ............... G07C 5/008 702/63 |
| 8,941,463 | B2 | 1/2015 | Rovik et al. |
| 9,003,492 | B2 | 4/2015 | Katar et al. |
| 9,031,231 | B2 | 5/2015 | Asim et al. |
| 9,035,606 | B2* | 5/2015 | Ross ............... B60L 53/60 320/109 |
| 9,043,059 | B2 | 5/2015 | Ishibashi et al. |
| 9,050,901 | B2 | 6/2015 | Kim et al. |
| 9,094,212 | B2 | 7/2015 | Thomas et al. |
| 9,256,897 | B2 | 2/2016 | Marlin et al. |
| 9,280,765 | B2 | 3/2016 | Hammad |
| 9,283,856 | B2 | 3/2016 | Huntzicker et al. |
| 9,300,152 | B2* | 3/2016 | Juhasz ............... H02J 7/00 |
| 9,333,871 | B2 | 5/2016 | Reineccius et al. |
| 9,350,729 | B2* | 5/2016 | Novak ............... H04L 63/10 |
| 9,352,659 | B1* | 5/2016 | Turner ............... B60L 53/30 |
| 9,371,007 | B1 | 6/2016 | Penilla et al. |
| 9,373,205 | B2 | 6/2016 | Outwater et al. |
| 9,378,345 | B2 | 6/2016 | Zhang et al. |
| 9,391,977 | B2 | 7/2016 | Grigg et al. |
| 9,396,462 | B2* | 7/2016 | Littrell ............... B60L 53/65 |
| 9,436,944 | B2 | 9/2016 | Turner |
| 9,505,317 | B2* | 11/2016 | Littrell ............... B60L 53/31 |
| 9,516,024 | B2 | 12/2016 | Kirsch et al. |
| 9,751,416 | B2* | 9/2017 | Hafner ............... G06Q 40/00 |
| 9,830,595 | B2* | 11/2017 | Anderson ............... G06Q 20/12 |
| 9,919,610 | B1* | 3/2018 | Sarwat ............... H02M 5/275 |
| 10,279,698 | B2* | 5/2019 | Bridges ............... H02J 3/008 |
| 10,486,541 | B2 | 11/2019 | Littrell ............... B60L 53/67 |
| 10,529,037 | B2* | 1/2020 | Forbes, Jr. ............... H02J 13/0086 |
| 10,581,253 | B2* | 3/2020 | Preindl ............... H02J 7/0014 |
| 10,637,294 | B2* | 4/2020 | Sarwat ............... H02J 50/12 |
| 10,643,288 | B2* | 5/2020 | Orsini ............... G06F 21/78 |
| 2004/0139354 | A1 | 7/2004 | Jones et al. |
| 2007/0150744 | A1 | 6/2007 | Cheng et al. |
| 2010/0145837 | A1 | 6/2010 | Graziano et al. |
| 2010/0274570 | A1 | 10/2010 | Proefke et al. |
| 2012/0191600 | A1 | 7/2012 | Boot |
| 2012/0239571 | A1 | 9/2012 | Boot |
| 2012/0268245 | A1 | 10/2012 | Alexander et al. |
| 2012/0268247 | A1 | 10/2012 | Boot et al. |
| 2013/0054457 | A1 | 2/2013 | Strickland |
| 2013/0096995 | A1 | 4/2013 | Rosalik |
| 2013/0241483 | A1 | 9/2013 | Karch et al. |
| 2013/0281017 | A1 | 10/2013 | Bondesen et al. |
| 2013/0292469 | A1 | 11/2013 | Acosta-Cazaubon et al. |
| 2014/0207498 | A1 | 7/2014 | Cho |
| 2014/0266004 | A1 | 9/2014 | Andrews, Jr. |
| 2014/0289082 | A1 | 9/2014 | Seo et al. |
| 2014/0337955 | A1 | 11/2014 | Mendelovich et al. |
| 2015/0022151 | A1 | 1/2015 | Tabatowski-Bush |
| 2015/0024688 | A1 | 1/2015 | Hrabak et al. |
| 2015/0095233 | A1 | 4/2015 | Wild et al. |
| 2015/0172739 | A1 | 6/2015 | Shaw |
| 2015/0324798 | A1 | 11/2015 | Kai et al. |
| 2016/0075249 | A1 | 3/2016 | Graber et al. |
| 2016/0119310 | A1 | 4/2016 | Marlin et al. |
| 2016/0229305 | A1 | 8/2016 | Shumaker et al. |
| 2017/0012951 | A1 | 1/2017 | Mennes et al. |

FOREIGN PATENT DOCUMENTS

| | | |
|---|---|---|
| CA | 2773939 | 10/2012 |
| CA | 2786188 | 2/2013 |
| CA | 2569355 | 10/2014 |
| EP | 2109203 | 10/2009 |
| EP | 2479732 | 7/2012 |
| EP | 2500209 | 9/2012 |
| EP | 2514624 | 10/2012 |
| EP | 2514625 | 10/2012 |
| EP | 2529973 | 12/2012 |
| EP | 2559590 | 2/2013 |
| EP | 2562729 | 2/2013 |
| EP | 2574495 | 4/2013 |
| EP | 2784907 | 10/2014 |
| EP | 2991014 | 3/2016 |
| WO | 2007071191 | 6/2007 |
| WO | 2008115718 | 9/2008 |
| WO | 2009090813 | 7/2009 |
| WO | 2010009502 | 7/2010 |
| WO | 2010087340 | 8/2010 |
| WO | 2010096506 | 8/2010 |
| WO | 2011109460 | 9/2011 |
| WO | 2011154218 | 12/2011 |
| WO | 2012142045 | 10/2012 |
| WO | 2012177812 | 12/2012 |
| WO | 2013076834 | 5/2013 |
| WO | 2014088740 | 6/2014 |
| WO | 2014182865 | 11/2014 |
| WO | 2015048807 | 4/2015 |
| WO | 2015179260 | 11/2015 |
| WO | 2016089925 | 6/2016 |
| WO | 2016114841 | 7/2016 |

OTHER PUBLICATIONS

J. Black, "Authenticated Encryption", Nov. 12, 2003.
M. Bellare and C. Namprempre, "Authenticated Encryption: Relations Among Notions and Analysis of the Generic Composition

(56) References Cited

OTHER PUBLICATIONS

Paradigm", Journal of Cryptology, vol. 21, Iss. 4, pp. 469-491, 2008.

International Standard ISO/IEC 19772:2009, "Information technology—Security techniques—Authenticated encryption", Feb. 15, 2009.

Vaidya et al., "Effective Public Key Infrastructure for Vehicle-to-Grid Network", DIVANet'14 ACM, pp. 95-101, Sep. 21-26, 2014.

Vaidya et al., "Multi-doman Public Key Infrastructure for Vehicle-to-Grid Network", MILCOM 2015 IEEE, pp. 1-6.

Vaidya et al., "Security and Privacy-Preserving Mechanism for Aggregator Based Vehicle-to-Grid Network", Ad-Hoc Networks LNICSSITE 140, pp. 75-85, Nov. 2014.

Ritrovati et al., "Active role of a NFC enabled smartphone in EV-EVSE charging process", IEEE IEVC 2014, Ancona, Italy.

Chan et al., "Cyber-Physical Device Authentication for Smart Grid Electric Vehicle Ecosystem", IEEE Journal on Selected Areas in Communications, vol. 32, Issue 7, pp. 1509-1517, Jul. 2014.

Kim et al., "TSAF: Tamper-Resistant and Scalable Mutual Authentication Framework for Plug-in EV Charging", IEEE SmartGridComm Symposium 2013—Smart Grid Cyber Security and Privacy.

Nicanfar et al., "Robust Privacy-Preserving Authentication Scheme for Communication Between Electric Vehicle as Power Energy Storage and Power Stations", 2013 IEEE INFOCOM Workshop on Communications and Control for Smart Energy Systems, pp. 3429-3434.

Saxena et al., "Lightweight Privacy-Preserving Authentication Scheme for V2G Networks in the Smart Grid", IEEE 2015 TrustCom/BigDataSE/ISPA, pp. 604-611.

Li et al., "Proactive key dissemination-based fast authentication for in-motion inductive EV charging", IEEE ICC 2015 SAC—Communications for the Smart Grid, pp. 795-801.

Li et al., "Portunes+: Privacy-Preserving Fast Authentication for Dynamic Electric Vehicle Charging", IEEE Transactions on Smart Grid, 2016, pp. 1-9.

Hussain et al., "PBF: A New Privacy-Aware Billing Framework for Online Electric Vehicles with Bidirectional Auditability", Apr. 2015, pp. 1-13.

Jones et al., "JSON Web Token (JWT)", Internet Engineering Task Force (IETF), May 2015, pp. 1-30.

M. Bellare, "Authenticated Encryption", UCSD, May 21, 2017.

\* cited by examiner

Reflexive Function 905 if $f(x\_1, x\_2, ..., x\_i-1, x\_i, x\_i+1, ...x\_n) = y$, then $f(x\_1, x\_2, ..., x\_i-1, y, x\_i+1, ..., x\_n) = x\_i$.

METHODS AND SYSTEMS FOR CONJUGATED AUTHENTICATION AND AUTHORIZATION

RELATED APPLICATIONS

The present application claims benefit from the U.S. provisional application Ser. No. 62/509,248 to Mouftah et al, entitled "METHODS AND SYSTEMS FOR CONJUGATED AUTHENTICATION AND AUTHORIZATION", filed on May 22, 2017, the entire contents of which are incorporated herein by reference.

FIELD OF THE INVENTION

The invention generally pertains to authentication and authorization, and in particular to methods and systems for conjugated authentication and authorization of two entities, for example where the credentials of one entity is generated with information from the other entity. More particularly, including authentication and authorization of a user and an electric vehicle for securely charging the batteries of electric vehicles.

BACKGROUND OF THE INVENTION

In recent years, the awareness of environmental impact in the daily life of the population has taken a renewed interest. It is now common that in the conscience of the population, the carbon print of transportation, together with economic incentives from governments to reduce the purchase price of "green vehicles" has detonated the adoption of green technologies. An example of those green vehicles are electric vehicles and hybrid cars. An electric vehicle (EV) is a car that, generally speaking, has cells or batteries that store energy and use an electric motor for propulsion of the vehicle, implementing regenerative braking to charge the batteries during driving conditions and being capable of being charged by a charging station. Hybrid electric vehicles (HEV) are those which combine an internal combustion engine (which consumes hydrocarbon-based fuel such as gasoline, diesel, natural gas, propane or other) and also has a generator, rechargeable batteries, regenerative braking and an electric motor used for the propulsion of the vehicle. Hybrid electric vehicles (HEV) may or may not use the combustion engine for the propulsion of the car. Hybrid cars are further subdivided in HEVs and plug-in hybrid electric vehicles (PHEV). In a HEV, the batteries in the vehicle are charged by the generator mechanically connected to the combustion engine and the energy is recovered by the regenerative braking (through the electric motor). In the case of the PHEV, the batteries can be further charged by connecting the vehicle to an external source of electrical power, for example, a power supply or a charging station which uses electricity from the power grid.

For the purpose of this disclosure, where we are concerned with the charging of the batteries on a vehicle by using a public (commercial) charging station, going forward we will refer to the electric vehicles and plug-in hybrid electric vehicles as an electric vehicle EV. With the increase in popularity of EVs, a net of charging stations is starting to proliferate in many cities to accommodate for the increasing demand of users who need to charge the batteries on their vehicles.

Currently, a user has several options to pay at a charging station. For instance, at some stations you can pay using cash, a credit card or a subscription to a chain of charging stations brand is becoming even more popular. With the credit card, a normal security check up is carried to validate the credit card before the transaction is authorized, for example, by requiring the user to enter a personal information number to allow the financial transaction to proceed. In the case of a subscription, the user enters into an agreement with the service provider which is in charge of facilitating the financial transaction between the charging station and the user. The user, after either providing a deposit into an account with the service provider, or by supplying a credit card number and authorization to the service provider to directly charge the credit card, is provided with user credentials that can be used to pay for the charge consumed. The user credentials can be provided to the user by means of a smart card which uses radio-frequency identification (RFID). RFID devices use electromagnetic fields to automatically identify and track tags attached to objects. The tags contain electronically-stored information. Passive tags collect energy from a nearby RFID reader's interrogating radio waves. Another means to provide the user credentials is by providing the user with an application to an electronic device, for example, a mobile device in the form of a cellular phone, or a hand-held device with connectivity to the Internet via WiFi or a cellular network like 3G, 5G, LTE. In addition, the electronic device can also employ other forms of communication which allows for the direct transfer of the user credentials, like the near-field communication (NFC) technology. The electronic device and the application would allow the user, once the user enters a password or uses its biometric authentication (using fingerprint readers, retinal eye scanners, voice recognition systems, hand geometry, facial recognition, etc.), the application transmits the user credentials to the charging station so the purchase of electric charge can be performed.

With the use of a smart card or the application in the electronic device, the cost for the amount of energy used to charge the battery of the EV may be directly transferred into the user's utility account or subscription-based account (i.e. direct billing) or a credit card. Each operator currently provides a smart card which can only be used for the purposes of charging the cost of the electricity consumed with its affiliated charging stations. This poses the problem for the user that, when dealing with more than one charging station operator, an EV user needs to carry several smart cards or, if using an electronic device, it would require the running of multiple applications. However, these cards may be vulnerable to cloning attacks, skimming attacks, eavesdropping, replay attacks, man-in-the-middle attacks etc. If a smart card is cloned, an individual may charge the batteries of an EV or PHEV using the validation data of another valid user's account committing fraud.

FIG. 1 describes a system and apparatus 100 of authorizing charging the batteries of an EV at a charging station in accordance with the prior art. The system 100 comprises an EV 110, a charging station 120 and a service provider 140. The charging station 120 comprises a charging station operator 122 and charging points 124 and 126 are shown. Although in this embodiment the charging station 120 comprises two charging points, it would be evident that the number of charging points can be one or more. The EV 110 is connected to the charging station 120 via the charging point 124. The electrical connection 10 between the EV 110 and the charging point 124 allows for electrical energy to be transferred from the power supply 123 to the batteries of the EV 110, so the batteries of the EV 110 get charged. Regarding electrical connection 10, one of the most common methods to connect the EV 110 to the charging point 124 comprises a cable and a plug (wired connection), there are other methods of transferring the charge that does not require electrical connection 10 to be a physical connection, such as inductive charging (also known as wireless charging or cordless charging). Inductive charging uses an electromagnetic field to transfer energy between an inductor in the charging point 124 and an inductor on the EV 110 through electromagnetic induction.

The charging station operator 122 in charging station 120 provides to the user 130 or the EV 110 with a financial transaction unit 127 to provide a payment method for the energy required to charge the batteries of the EV 110. The financial transaction unit 127 can be in the form of a cash register where cash can be accepted, a smart card radio-frequency identification (RFID) reader device, a credit card unit and other devices that can be used to perform the payment transaction. In the case of using of a credit card, user 130 provides the credit card to the FTU 127 and, if required, enters the personal identification number (PIN). FTU 127 provides the credit card information and PIN number to the charging station operator 122 through communication link 14. The charging station operator 122 sends the credit card information data and PIN number through communication link 17 to a financial institution 150 to validate the credit card of user 130. If the data is properly validated, the financial institution 150 will provide an authorization message through communication link 18 to the charging station operator 122, the charging station operator 122 can authorize the charging operation 10a by issuing a charging instruction through communication link 12 to the power supply 123. The power supply 123 provides the electrical charge through electrical connection 11 to the charging point 124 and the charging point 124 transfers the electrical charge through the electrical connection 10 to the EV 110.

If user 130 employs a subscription-based form of payment, for example: a smart card (with RFID), an electronic device with NFC technology or using an application running on the electronic device, the user 130 provides its user identification data through communication channel 13 to the financial transaction unit 127. The charging station operator 122 receives the user ID data from the FTU 127 through connection 14 and then transfers the user ID data to a service provider 140 through connection 15. The service provider 140 comprises a database with the subscription data and ID data, as well as the financial information related to the user 130. The service provider 140 also comprises a validation processing unit 141 which compares the user ID data received from connection 15 with the contents of its own database to validate the user ID data of user 130. The charging station operator 122 receives an authorization message from service provider 140 through connection 16, which allows the charging station operator 122 to authorize the battery charging operation 10a by issuing a charging instruction through communication link 12 to the power supply 123. The power supply 123 provides the electrical charge through electrical connection 11 to the charging point 124 and charging point 124 transfers the electrical charge through the electrical connection 10 to the EV 110.

If the subscription account of the user 130 requires the service provider 140 to validate or directly charge a credit card related to the user 130, such request and respective authorization is managed through communication link 18 between the service provider 140 and the financial institution 150.

In the example of the prior art, the service provider 140 can comprise an entity that provides services to a chain of charging stations 120, usually associated by sharing the brand name, even though the charging stations can be owned and operated by third parties, which own a franchise, as is the case with conventional gas stations.

Although one charging station 120 is depicted, it would be understood that a service provider 140 can be associated with multiple charging stations (120i to 120n, not shown) in a similar fashion, to support the authentication and authorization functions required by respective charging station operators 122.

The above described prior art allows for any person with the financial means, to charge the EV 110 without any further security verification, which means that if an EV is used by someone without authorization of the associated user 130, the EV 110 can still be charged at the charging stations 120.

Using the prior art security system of payments, a stolen EV could still be charged at the public charging station by the person who stole it by using the regular methods available to purchase energy.

Although existing prior art provides authentication and authorization mechanisms for allowing a user to purchase electrical charge at charging stations, still none of the prior art techniques provide adequate security measures for preventing identity theft of a user account at a charging station, nor preventing an EV or PHEV from being charged in the case that it has been stolen.

Accordingly, there is still the need in the industry for developing alternative authentication and authorization methods which would mitigate shortcomings of the prior art techniques.

SUMMARY OF THE INVENTION

There is an object of the invention to provide an improved methods and systems for authorizing a service transaction, which would avoid or mitigate disadvantages of the prior art.

According to one aspect of the invention, there is provided a method for authorizing a service transaction comprising: employing at least one hardware processor for receiving at a service provider: an identification data of a first entity; an identification data of a second entity; a reflexive data obtained from applying a reflexive function to the identification data of the first and second entities; at least one of the reflexive data and identification data of the first and second entities being received from the first entity, and the remaining one or more of the reflexive data and identification data of the first and second entities being received from the second entity; identifying from which entity the reflexive data has been received; applying the reflexive function to the reflexive data and to the identification data received from the other entity from which the reflexive data has not been received, to obtain a valuation data for the entity from which the reflexive data has been received to determine if the first and second entities are associated; comparing the valuation data with the identification data of the entity from which the reflexive data has been received; and authorizing the service transaction, provided the valuation data and the identification data for the entity from which the reflexive data has been received are the same, thereby verifying the first and second entities are associated.

The method described above further comprises a registration stage performed prior to the authorizing the service transaction, the registration stage comprising: at the service provider, having at least one memory device: receiving the identification data of the first entity; receiving the identification data of the second entity; applying the reflexive function to the identification data of the first and second entities to produce the reflexive data; and providing at least one of the reflexive data and identification data of the first and second entities to the first entity, and providing the remaining one or more of the reflexive data and identification data of the first and second entities to the second entity.

The method described above further comprises deleting the identification data of the first and second entities and the reflexive data from the at least one memory device.

In the method described above, the applying the reflexive function comprises applying a function possessing the following properties: if $f(x\_1, x\_2, \ldots, x\_i-1, x\_i, x\_i+1, \ldots, x\_n)=y$, then $f(x\_1, x\_2, \ldots, x\_i-1, y, x\_i+1, \ldots, x\_n)=x\_i$.

In the method described above: the receiving the identification data for the first entity comprises receiving a first pair of conjugated data containing the identification information for the first entity and the second entity; and the receiving the identification data for the second entity comprises receiving a second pair of conjugated data containing the identification information for the second entity and the first entity.

The method described above further comprises applying a cryptographic function to the first and second pairs to generate respective token tags for the first and second entities, and wherein the reflexive data is obtained from applying the reflexive function to the respective token tags for the first and second entities.

In the method described above: the first entity is a device of a user; the second entity is an electric vehicle associated with the user; and the reflexive data is stored in a storage element of the electric vehicle.

In the method described above: the first entity is a user-controlled device; the second entity is an electric vehicle associated with the user; the reflexive data is stored in a storage element of the electric vehicle; the identification data of the first and second entities comprises a pair of conjugated data containing the identification information for the first entity and the second entity; and the service transaction comprises charging the electric vehicle.

In the method described above, the cryptographic function is selected from a group consisting of: a hashing function, a message authentication code (MAC) function, and a keyed MAC function.

The method further comprises generating respective first and second credentials for the first and second entities for communicating with the service provider, comprising respective encrypted first and second token tags.

According to another aspect of the invention, there is provided a server for authorizing a service transaction comprising: a memory device having computer readable instructions stored thereon for execution by a processor, causing the processor to: receive: an identification data of a first entity; an identification data of a second entity; a reflexive data obtained from applying a reflexive function to the identification data of the first and second entities; at least one of the reflexive data and identification data of the first and second entities being received from the first entity, and the remaining one or more of the reflexive data and identification data of the first and second entities being received from the second entity; identify from which entity the reflexive data has been received; apply the reflexive function to the reflexive data and to the identification data received from the other entity from which the reflexive data has not been received, to obtain a valuation data for the entity from which the reflexive data has been received to determine if the first and second entities are associated; compare the valuation data with the identification data of the entity from which the reflexive data has been received; and authorize the service transaction, provided the valuation data and the identification data for the entity from which the reflexive data has been received are the same, thereby verifying the first and second entities are associated.

In the server described above, the computer readable instructions further cause the processor to perform a registration stage prior to the authorizing the service transaction, the registration stage comprising: receiving the identification data of the first entity; receiving the identification data of the second entity; applying the reflexive function to the identification data of the first and second entities to produce the reflexive data; providing at least one of the reflexive data and identification data of the first and second entities to the first entity, and providing the remaining one or more of the reflexive data and identification data of the first and second entities to the second entity; and deleting the identification data of the first and second entities and the reflexive data from the memory device.

In the server described above, computer readable instructions further cause the processor to: apply a hashing function to the identification data of the first entity to produce a first token; apply the hashing function to the identification data of the second entity to produce a second token; and apply an exclusive OR function to the first and second tokens to produce the reflexive data.

In the server described above, the computer readable instructions further cause the processor to identify one option, from a group of options consisting of, whether: the identification data of the device of the user has been received from the device of the user, and the identification data of the electric vehicle and the reflexive data have been received from the electric vehicle; the identification data of the device of the user and the reflexive data have been received from the device of the user, and the identification data of the electric vehicle has been received from the electric vehicle; the identification data of the device of the user and the identification data of the electric vehicle have been received from the device of the user, and the reflexive data has been received from the electric vehicle; the identification data of the device of the user and the reflexive data have been received from the device of the user, and the identification data of the electric vehicle has been received from the electric vehicle; the identification data of the electric vehicle has been received from the device of the user, and identification data of the device of the user and the reflexive data have been received from the electric vehicle; and the identification data of the electric vehicle and the reflexive data have been received from the device of the user, and the identification data of the device of the user has been received from the electric vehicle.

According to yet another aspect of the invention, there is provided a charging station for receiving, from a server computer, an authorization instruction for charging an electric vehicle associated with a user, the charging station comprising: a processor, and a memory having computer readable instructions stored thereon for execution by a processor, causing the processor to: receive: an identification data of a device of the user; an identification data of the electric vehicle; a reflexive data obtained from applying a reflexive function to the identification data of the device of the user and the electric vehicle; at least one of the reflexive data and identification data of the device of the user and the electric vehicle being received from the device of the user, and the remaining one or more of the reflexive data and identification data of the device of the user and the electric vehicle being received from the electric vehicle; and receive, from the server computer, the authorization instruction for charging the electric vehicle in response to the server computer: identifying an entity from which the reflexive data has been received, comprising identifying whether the reflexive data has been received from the device of the user or the electric vehicle; applying the reflexive function to the reflexive data and to the identification data received from the other entity from which the reflexive data has not been received, to obtain a valuation data for the entity from which the reflexive data has been received to determine if the device of the user and the electric vehicle are associated; comparing the valuation data with the identification data of the entity from which the reflexive data has been received; and generating the authorization instruction, provided the valuation data and the identification data for the entity from which the reflexive data has been received are the same, thereby verifying the device of the user and the electric vehicle are associated.

In the charging station described above, the computer readable instructions further cause the processor to identify one option, from a group of options consisting of, whether: the identification data of the device of the user has been received from the device of the user, and the identification data of the electric vehicle and the reflexive data have been received from the electric vehicle; and the identification data of the device of the user and the reflexive data have been received from the device of the user, and the identification data of the electric vehicle has been received from the electric vehicle.

In the charging station described above, the computer readable instructions further cause the processor to identify one option, from a group of options consisting of, whether: the identification data of the device of the user and the identification data of the electric vehicle have been received from the device of the user, and the reflexive data has been received from the electric vehicle; and the identification data of the device of the user and the reflexive data have been received from the device of the user, and the identification data of the electric vehicle has been received from the electric vehicle.

In the charging station described above, the computer readable instructions further cause the processor to identify one option, from a group of options consisting of, whether: the identification data of the electric vehicle has been received from the device of the user, and identification data of the device of the user and the reflexive data have been received from the electric vehicle; and the identification data of the electric vehicle and the reflexive data have been received from the device of the user, and the identification data of the device of the user has been received from the electric vehicle.

In the charging station described above, the reflexive function possesses the following properties: if $f(x\_1, x\_2, \ldots, x\_{i-1}, x\_i, x\_{i+1}, \ldots x\_n)=y$, then $f(x\_1, x\_2, \ldots, x\_{i-1}, y, x\_{i+1}, \ldots, x\_n)=x\_i$.

In the charging station described above, the reflexive function comprises an exclusive OR operation, XOR.

According to one more aspect of the present invention, there is provided a system for authorizing a service transaction comprising: a processor, and a storage element having computer readable instructions stored thereon for execution by the processor, causing the processor to: receive an identification data of a first entity; receive an identification data of a second entity; receive a reflexive data obtained from applying a reflexive function to the identification data of the first and second entities; at least one of the reflexive data and identification data of the first and second entities have been received from the first entity, and the remaining one or more of the reflexive data and identification data of the first and second entities have been received from the second entity; identify from which entity the reflexive data has been received; apply the reflexive function to the reflexive data and to the identification data received from the other entity from which the reflexive data has not been received, to obtain a valuation data for the entity from which the reflexive data has been received to determine if the first and second entities are associated; compare the valuation data with the identification data of the entity from which the reflexive data has been received; and authorize the service transaction, provided the valuation data and the identification data for the entity from which the reflexive data has been received are the same, thereby verifying the first and second entities are associated.

According to yet one more aspect of the invention, there is provided a system for authorizing a service transaction comprising: at least one processor and a memory having computer readable instructions stored thereon, forming: means for receiving: an identification data of a first entity; an identification data of a second entity; a reflexive data obtained from applying a reflexive function to the identification data of the first and second entities; at least one of the reflexive data and identification data of the first and second entities being received from the first entity, and the remaining one or more of the reflexive data and identification data of the first and second entities being received from the second entity; means for identifying from which entity the reflexive data has been received; means for applying the reflexive function to the reflexive data and to the identification data received from the other entity from which the reflexive data has not been received, to obtain a valuation data for the entity from which the reflexive data has been received to determine if the first and second entities are associated; means for comparing the valuation data with the identification data of the entity from which the reflexive data has been received; and means for authorizing the service transaction, provided the valuation data and the identification data for the entity from which the reflexive data has been received are the same, thereby verifying the first and second entities are associated.

According to yet one more aspect of the invention, there is provided a service station for receiving an authorization instruction for a service transaction from a server computer, the service station comprising: a processor, and a memory having computer readable instructions stored thereon for execution by a processor, causing the processor to: receive: an identification data of a first entity; an identification data of a second entity; a reflexive data obtained from applying a reflexive function to the identification data of the first and second entities; at least one of the reflexive data and identification data of the first and second entities being received from the first entity, and the remaining one or more of the reflexive data and identification data of the first and second entities being received from the second entity; and receive, from the server computer, the authorization instruction for the service transaction in response to the server computer: identifying from which entity the reflexive data has been received; applying the reflexive function to the reflexive data and to the identification data received from the other entity from which the reflexive data has not been received, to obtain a valuation data for the entity from which the reflexive data has been received to determine if the first and second entities are associated; comparing the valuation data with the identification data of the entity from which the reflexive data has been received; and generating the authorization instruction, provided the valuation data and the identification data for the entity from which the reflexive data has been received are the same, thereby verifying the first and second entities are associated.

According to yet one more aspect of the invention, there is provided a method for receiving an authorization instruction for a service transaction from a server computer, the method comprising: employing at least one hardware processor for: receiving: an identification data of a first entity; an identification data of a second entity; a reflexive data obtained from applying a reflexive function to the identification data of the first and second entities; at least one of the reflexive data and identification data of the first and second entities being received from the first entity, and the remaining one or more of the reflexive data and identification data of the first and second entities being received from the second entity; and receiving, from the server computer, the authorization instruction for the service transaction in response to the server computer: identifying from which entity the reflexive data has been received; applying the reflexive function to the reflexive data and to the identification data received from the other entity from which the reflexive data has not been received, to obtain a valuation data for the entity from which the reflexive data has been received to determine if the first and second entities are associated; comparing the valuation data with the identification data of the entity from which the reflexive data has been received; and generating the authorization instruction, provided the valuation data and the identification data for the entity from which the reflexive data has been received are the same, thereby verifying the first and second entities are associated.

Thus, improved methods and systems for authorizing a service transaction have been provided.

BRIEF DESCRIPTION OF THE DRAWINGS

Embodiments of the present invention will be further described with reference to the accompanying drawings, in which.

DETAILED DESCRIPTION OF THE EMBODIMENTS

As mentioned above, the existing authentication and authorization mechanisms for EV charging can only authenticate and authorize either the EV or the EV user, but not both at the same time.

Figure 13A:
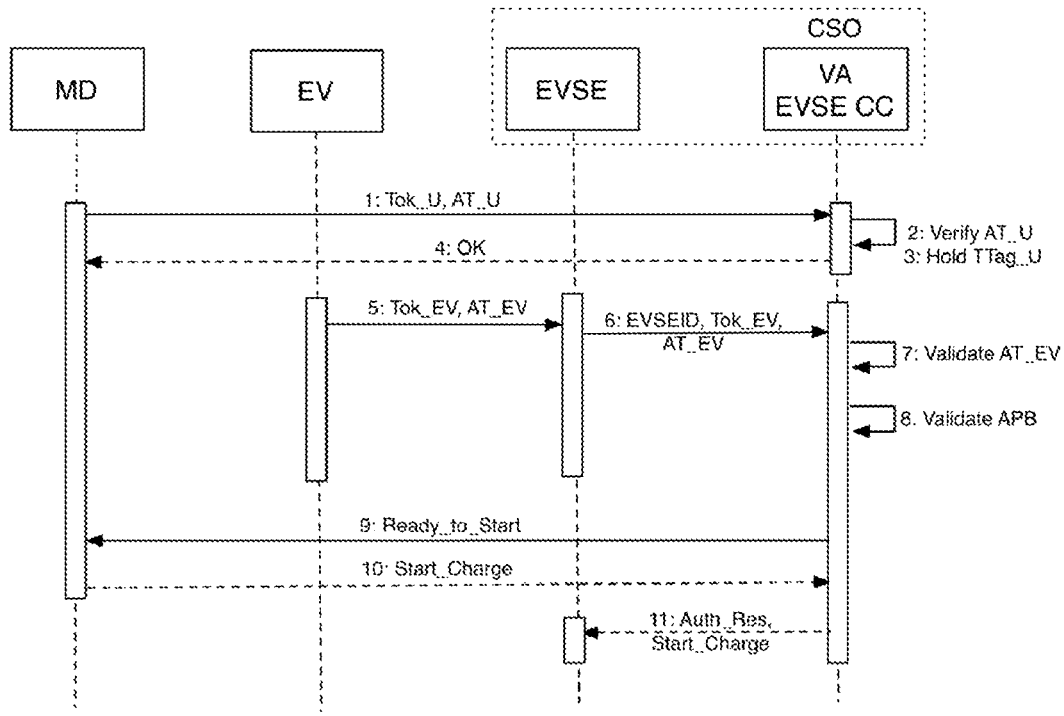
FIGS. 13a and 13b show a call flow diagrams for a validation process of Conjugated Authentication and Authorization (CAA) with CSO VA, and a validation process of CAA with L-EMSP VA respectively.
Figure 13B:
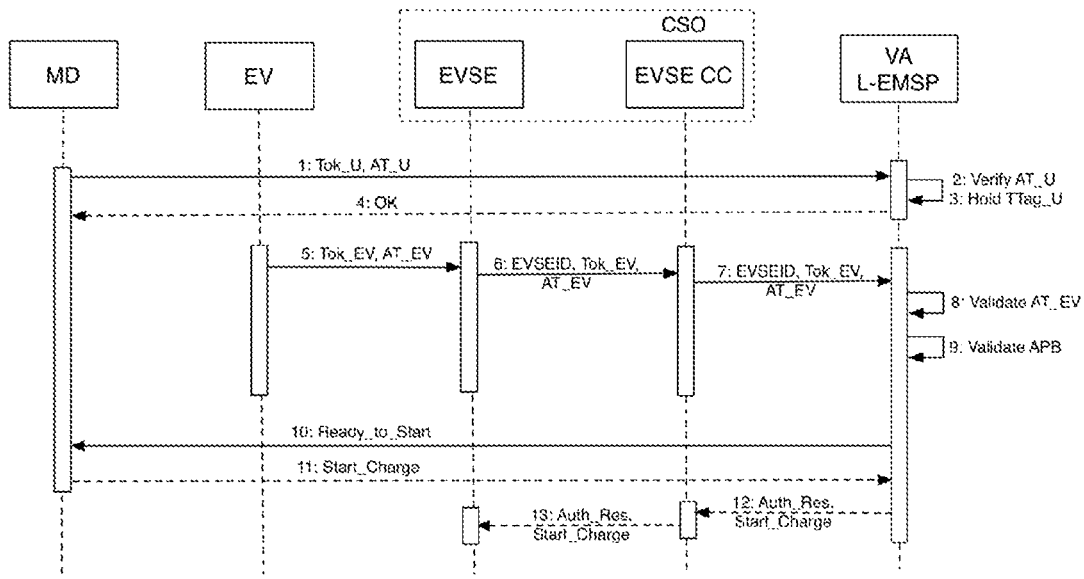
Figures 13C, 14:
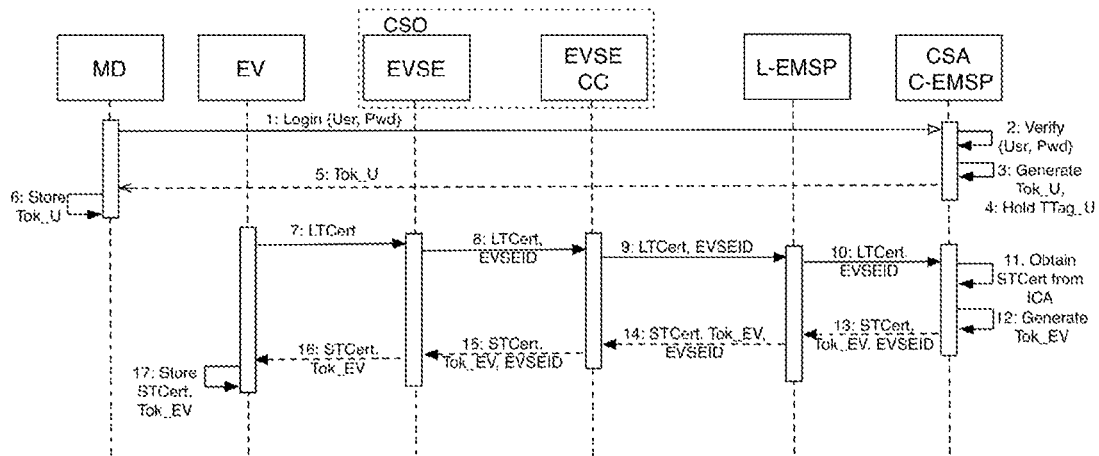
FIG. 13c illustrates a call flow diagram for token generation at C-EMSP CSA.
FIG. 14 illustrates an example of a reflexive function.

According to one aspect of the invention, there is provided a method for authorizing a service transaction comprising:

employing at least one hardware processor for receiving at a service provider:

an identification data of a first entity, for example, a user ID or identification data stored in a device associated with a user;

an identification data of a second entity, for example identification data of an electric vehicle;

a reflexive data obtained from applying a reflexive function to the identification data of the first and second entities, for example applying a reflexive function to the identification data of the user and of the electric vehicle, for example, by applying a function 905 that possesses the following properties: if $f(x\_1, x\_2, \ldots, x\_{i-1}, x\_i, x\_{i+1}, \ldots x\_n) = y$, then $f(x\_1, x\_2, \ldots, x\_{i-1}, y, x\_{i+1}, \ldots, x\_n) = x\_i$, as illustrated in FIG. 14. In an embodiment of the invention the reflexive data is generated by a credential generator 144 in the credentials service authority 143 of the service provider 140.

In one example, the credentials generator 144 comprises a storage element 146 and a security token generator 147 that causes a processor to apply the reflexive function described above to the electric vehicle identification data and the user identification data to form the reflexive data 147a;

at least one of the reflexive data and identification data of the first and second entities being received from the first entity, and the remaining one or more of the reflexive data and identification data of the first and second entities being received from the second entity, for example, in accordance with one of the options shown in the second and third columns of Table 1 below.

TABLE 1

Storage of Data and Comparison of Valuation and Identification data

| Option | Data stored in User service | Data stored in Electric Vehicle | Valuation data= | ID of entity to compare vs. valuation data: |
|---|---|---|---|---|
| 1 | User ID | EV ID, Reflexive data | Reflexive function (Reflexive data, User ID) | EVID |
| 2 | EV ID | User ID, Reflexive data | Reflexive function (Reflexive data, EV ID) | User ID |
| 3 | User ID, EV ID | Reflexive data | Reflexive function (Reflexive data, User ID) or Reflexive function (Reflexive data, EV ID) | EV ID or User ID |
| 4 | Reflexive data | User ID, EV ID | Reflexive function (Reflexive data, User ID) or Reflexive function (Reflexive data, EV ID) | EV ID or User ID |
| 5 | User ID, Reflexive data | EVID | Reflexive function (Reflexive data, EV ID) | User ID |
| 6 | EV ID, Reflexive data | User ID | Reflexive function (Reflexive data, User ID) | EV ID | identifying from which entity the reflexive data has been received, e.g. if it was received from the electric vehicle or from a device associated with the user, in accordance with one of the options shown in the second and third columns of the previous table;

applying the reflexive function to the reflexive data and to the identification data received from the other entity from which the reflexive data has not been received, to obtain a valuation data for the entity from which the reflexive data has been received to determine if the first and second entities are associated, for example, in accordance with one of the options shown in the fourth column of the previous table;

comparing the valuation data with the identification data of the entity from which the reflexive data has been received, for example, in accordance with one of the options shown by comparing the fourth and fifth columns of the previous table; and authorizing the service transaction, provided the valuation data and the identification data for the entity from which the reflexive data has been received are the same, thereby verifying the first and second entities are associated. For example, in the case that the result of the fourth column and the fifth column in one of the options are equal.

In one embodiment the service transaction can be any transaction that requires the association of two or more entities. In one example, the service transaction is a charging operation 10a of an electric vehicle that requires to be authorized when the electric vehicle and the user associated with the electric vehicle are requesting the charging transaction.

In an embodiment of the method described above, the method further comprises a registration stage performed prior to the authorizing the service transaction. The registration stage requires the first and second entities to provide their respective identification data, for example, the user identification data and the electric vehicle identification data have to be provided to a server or computer of the service provider.

In one embodiment of the method described above, the registration stage further comprises: at the service provider, having at least one memory device:

receiving the identification data of the first entity, e.g. identification data of a user;

receiving the identification data of the second entity, e.g. identification data of an electric vehicle;

applying the reflexive function to the identification data of the first and second entities to produce the reflexive data, for example, by applying a function that possesses the following properties: if $f(x\_1, x\_2, \ldots, x\_i-1, x\_i, x\_i+1, \ldots x\_n)=y$, then $f(x\_1, x\_2, \ldots, x\_i-1, y, x\_i+1, \ldots, x\_n)=x\_i$; and providing at least one of the reflexive data and identification data of the first and second entities to the first entity, and providing the remaining one or more of the reflexive data and identification data of the first and second entities to the second entity, for example, providing the data in accordance to one of the options of the second and third columns of the above-mentioned table.

The method described above further comprises deleting the identification data of the first and second entities and the reflexive data from the at least one memory device. By deleting the data from the service provider, the security advantages of not having a database prone to be victim of hacking attacks or unauthorized access is achieved.

In an embodiment of the method described above, receiving the identification data for the first entity comprises receiving a first pair of conjugated data containing the identification information for the first entity and the second entity, for example, the identification data for the user contains the conjugated data of the identification information of the user and identification information of the electric vehicle; and receiving the identification data for the second entity comprises receiving a second pair of conjugated data containing the identification information for the second entity and the first entity, for example, the identification data for the electric vehicle contains the conjugated data of the identification information of the electric vehicle and identification information of the user.

In an embodiment of the method of the invention, the method described above further comprises applying a cryptographic function to the first and second pairs to generate respective token tags for the first and second entities, and wherein the reflexive data is obtained from applying the reflexive function to the respective token tags for the first and second entities. For example, a token tag for the user is created by applying a cryptographic function to the identification data for the user containing the conjugated data of the identification information of the user and identification information of the electric vehicle. In a similar way, a token tag for the electric vehicle is generated by applying a cryptographic function to the conjugated data of the identification information of the electric vehicle and identification information of the user.

Examples of the cryptographic function can be a cryptographic hash function, which is designed to take a string of any length as input and produce a fixed-length hash value. For instance, complying with secure hash algorithms 2 or 3 (e.g. SHA2, SHA3). Since the cryptographic hash function may only ensure message integrity, a Message Authentication Code (MAC) can be also used. Hashed Message Authentication Code (HMAC) is a specific type of MAC involving a cryptographic hash function and a secret key. For instance, HMAC-SHA2, HMAC-SHA3. As a further example, the reflexive data is obtained from applying the reflexive function described above to the respective token tags for the user and the electric vehicle. In a further example, the reflexive data is obtained from applying an exclusive OR function to the respective token tags for the user and the electric vehicle.

According to an embodiment of the invention, there is provided a charging station for receiving, from a server computer, an authorization instruction for charging an electric vehicle associated with a user. In an example, the server computer is located at a service provider that is in communication with the service station. In another embodiment, the server computer may be located at the charging station or be part of the charging station. The service provider comprises a credentials service authority which further comprises a credentials generator and a conjugated validation processing unit. The credential generator is used to generate tokens and/or credentials that are provided to a user device associated to the user and also to the electric vehicle associated with the user as data which will be used during the authorization process in order to get authorization to charge the electric vehicle. The conjugated validation processing unit of the credentials service authority is the processing unit which is employed during the authorization process to validate the respective data that is required to identify the user and the electric vehicle, for example, credentials and/or tokens, as to confirm that the user and the electric vehicle are associated. In order to determine if the user and the electric vehicle are associated, either the data for the user or for the vehicle comprise a reflexive data which, when processed by a reflexive processing module of the conjugated validation processing unit, is used to determine that the user and the electric vehicle are associated.

In this embodiment, the charging station comprises a processor, and a memory having computer readable instructions stored thereon for execution by a processor, causing the processor to receive:
  identification data of a device of the user, which in an example can be a user token or a user credential stored in a device associated with the user, for example, an electronic device with a storage element or memory (e.g. a mobile phone, a hand-held device, a tablet, etc.) or a smart card that employs RFID or other device which can store the identification data and that can transmit the data;
  identification data of the electric vehicle, which can be data identifying the vehicle provided by the manufacturer of the vehicle, data provided by the credentials service authority, for example, a token or an electric vehicle credential;
  reflexive data obtained from applying a reflexive function to the identification data of the device of the user and the electric vehicle, for example, by applying a function that possesses the following properties: if $f(x\_1, x\_2, \ldots, x\_{i-1}, x\_i, x\_{i+1}, \ldots x\_n)=y$, then $f(x\_1, x\_2, \ldots, x\_{i-1}, y, x\_{i+1}, \ldots, x\_n)=x\_i$. In an embodiment of the invention the reflexive data is generated by a credential generator in the credentials service authority of the service provider. In one example, the credentials generator comprises a storage element and a security token generator that causes a processor to apply the reflexive function described above to the electric vehicle identification data and the user identification data to form the reflexive data.

In this embodiment, at least one of the reflexive data and identification data of the device of the user and the electric vehicle being received from the device of the user, and the remaining one or more of the reflexive data and identification data of the device of the user and the electric vehicle being received from the electric vehicle. As an example, Table 2 shows possible options to store the user ID, the electric vehicle ID (EV ID) and the reflexive data in either a storage element of the device associated with the user (here identified as user device) and a storage element in the electric vehicle.

TABLE 2

Options or storing user ID, electric vehicle ID and reflexive data

| Option | User service | Electric Vehicle |
|---|---|---|
| 1 | User ID | EV ID, Reflexive data |
| 2 | EV ID | User ID, Reflexive data |
| 3 | User ID, EV ID | Reflexive data |
| 4 | Reflexive data | User ID, EV ID |
| 5 | User ID, Reflexive data | EV ID |
| 6 | EV ID, Reflexive data | User ID |

In this embodiment, the charging station comprises a processor, and a memory having computer readable instructions stored thereon for execution by a processor, causing the processor to also receive:
  receive, from the server computer, the authorization instruction for charging the electric vehicle in response to the server computer:
    identifying an entity (e.g. a device associated with the user or the electric vehicle), from which the reflexive data has been received, for example, identifying whether the reflexive data has been received from the device of the user or the electric vehicle;
    applying the reflexive function to the reflexive data and to the identification data received from the other entity from which the reflexive data has not been received, to obtain a valuation data for the entity from which the reflexive data has been received to determine if the device of the user and the electric vehicle are associated. For example, Table 3 illustrates how the reflexive data function is applied depending on whether the reflexive data is stored in a storage element of the device of the user or in a storage element in the electric vehicle.

TABLE 3

Application of reflexive data

| Option | Data stored in User service | Data stored in Electric Vehicle | Valuation data= |
|---|---|---|---|
| 1 | User ID | EV ID, Reflexive data | Reflexive function (Reflexive data, User ID) |
| 2 | EV ID | User ID, Reflexive data | Reflexive function (Reflexive data, EV ID) |
| 3 | User ID, EV ID | Reflexive data | Reflexive function (Reflexive data, User ID) or Reflexive function (Reflexive data, EV ID) |
| 4 | Reflexive data | User ID, EV ID | Reflexive function (Reflexive data, User ID) or Reflexive function (Reflexive data, EV ID) |
| 5 | User ID, Reflexive data | EV ID | Reflexive function (Reflexive data, EV ID) |
| 6 | EV ID, Reflexive data | User ID | Reflexive function (Reflexive data, User ID) | comparing the valuation data with the identification data of the entity from which the reflexive data has been received; and generating the authorization instruction, provided the valuation data and the identification data for the entity from which the reflexive data has been received are the same, thereby verifying the device of the user and the electric vehicle are associated. For example, Table 1 above shows various options for comparison of valuation data with the identification data.

In the embodiment described above, if the valuation data equals the ID of the entity which is compared to, the charging of the vehicle by the user is authorized. The server of the embodiment of the invention described above may comprise both, a server computer or a server comprising a memory device having stored readable instructions for execution by a processor. In other embodiments the server may comprise computer executable program code stored in a memory or a device that provides functionality for other programs or devices, called "clients". A server may also comprise one or more computers. In one embodiment the server computer may be located at the service station. A computer is a device that can be instructed to carry out sequences of arithmetic or logical operations automatically via computer programming.

In this way, a person or ordinary skill in the art can realize the many advantages provided by the present invention. One such advantages is that by performing the method of the invention, the authorization may be executed without requiring to consult an external database. By not requiring the use of an external database, the security provided to the transaction is increased because all the problems associated with hacking attacks and unauthorized access to databases are avoided. Another advantage is that the transmission of the identification of the electric vehicle and the user ID is required only during the registration process. Furthermore, by selectively applying a reflexive function to the data stored in either the vehicle or a device of the user, the present invention saves all the time normally involved in communicating the data to a server and the time involved in further searching the contents of the database. Furthermore, the present embodiment provides the benefits of a very fast authorization process by providing all the data required for the authorization from the two entities. That is, the only time required for authorizing the service transaction (charging of the electric vehicle) is the time required to perform the reflexive function in the reflexive processing module of the credentials service authority of the service provider. Thus, the methods and systems of the present invention are more secure and expedient compared with the prior art.

Figure 1:
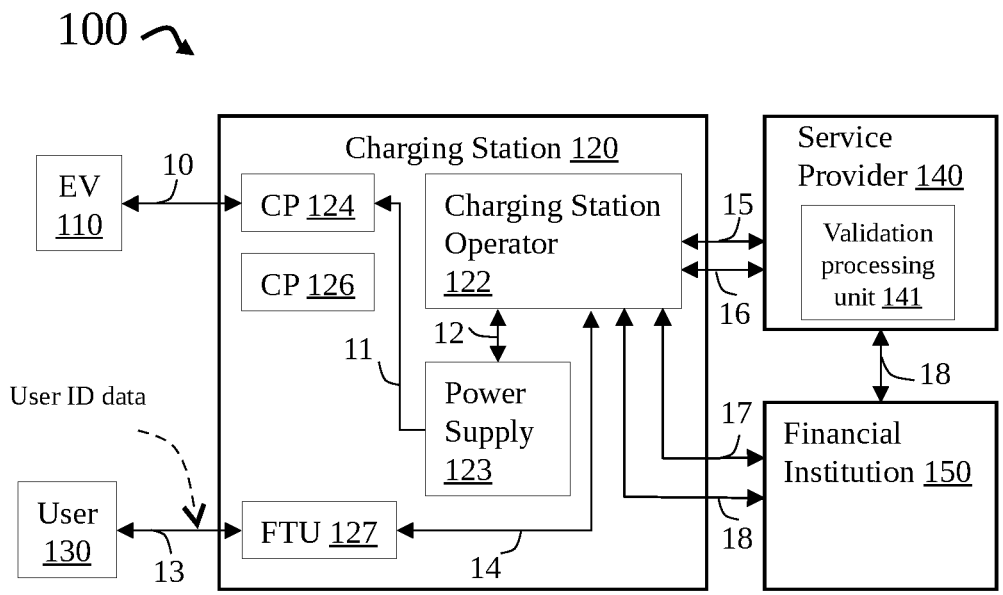
FIG. 1 illustrates a block diagram of a battery charging system for providing electric charge to an electric vehicle in accordance with the prior art.
Figure 2:
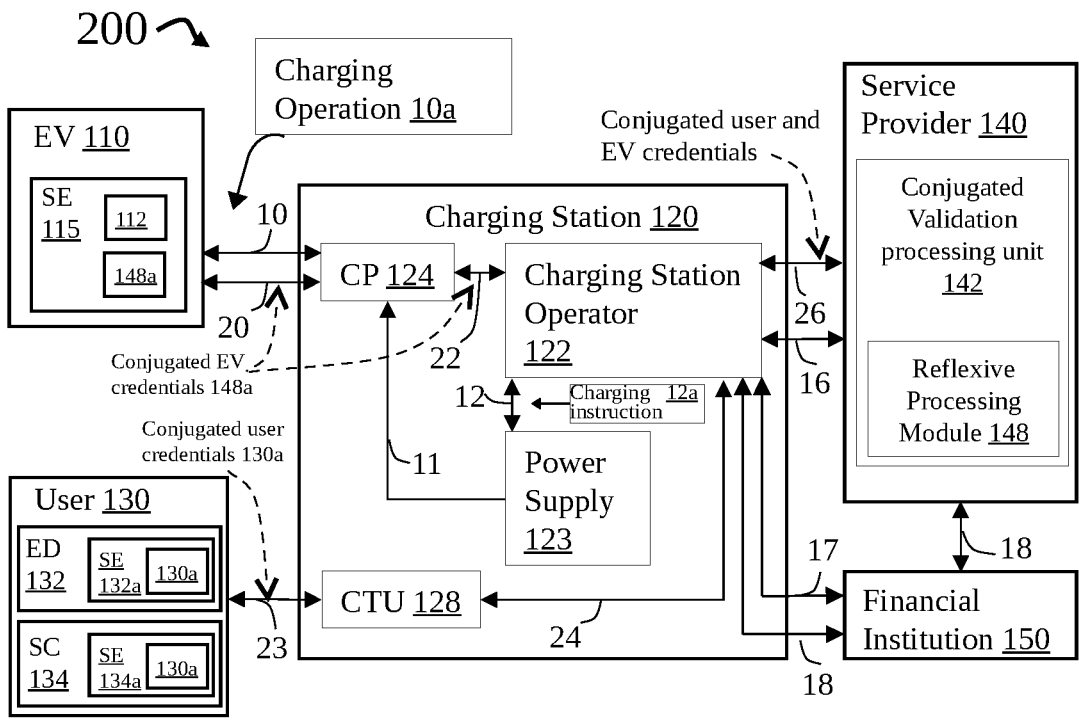
FIG. 2 illustrates a block diagram of a battery charging system for providing electric charge to an electric vehicle (EV) in accordance with one embodiment of the invention using conjugated user and EV credentials.

FIG. 2 shows an embodiment 200 in accordance with the present invention, where a conjugated authorization of the user and the EV are provided. Same numerals refer to the same structures or connections as previously described. Similar to FIG. 1, the system 200 comprises an EV 110, a charging station 120, a user 130, a service provider 140 and a financial institution 150. In order to obtain one or more of the benefits of the present disclosure, the charging operation 10a requires the authorization of both, the EV 110 and the user 130 in conjunction. That is, to perform a conjugated authorization of the EV 110 and the user electronic device 160, the user credentials for user 130 must contain data that can be correlated to the EV 110. In a similar fashion, the credentials for the EV 110 must contain data that can be correlated to the user 130. Furthermore, the embodiment 200 must support the transfer and validation of the conjugated credentials from the EV 110 and the user 130 to allow the battery charging operation 10a, which is a form of a service transaction.

The user 130 is provided with unique user credentials which are stored in a memory device or storage element (SE) 132a within the user electronic device ED 132 or in a storage element SE 134a of the user smart card (SC) 134. The conjugated user credentials 130a comprise data that is related to the user 130 as well as data related to the credentials of the EV 110. In order to provide the conjugated user credentials 130a from the ED 132 or the SC 134 to the charging station operator 122, a communication link 23 needs to exist between the ED 132 or the SC 134 and the credentials transfer unit (CTU) 128. Similar to the FTU 127 of FIG. 1, the credentials transfer unit 128 can be a smart card radio-frequency identification (RFID) reader device to communicate with SC 134. The credentials transfer unit 128 can also comprise a near field communication (NFC) device, or use a wireless communication protocol like WiFi or cellular technology like 3G, 4G, 5G and LTE, to communicate with the ED 132 to receive the conjugated user credentials of user 130. The credentials transfer unit 128 uses communication link 24 to transfer the conjugated user credentials to the charging station operator 122.

The EV 110 is provided with unique EV credentials 112 which are stored in a memory device or storage element SE 115 within the EV 110. In one embodiment, the memory device or storage element is collocated in a memory module of the EV. The conjugated EV credentials 148a comprise data that is related to the EV 110 as well as data related to the credentials of the user 130. In order to provide the conjugated EV credentials 148a from the EV 110 to the charging station operator 122, a communication link 20 needs to exist between the SE 115 of the EV 110 and the charging point 124. Communication link 20 can be either implemented in a wired connection (as part of the cable and plug connected between the EV 110 and CP 124) or it can be a wireless communication where different wireless protocols can be employed to transfer the conjugated EV credentials to the charging station 120. In this embodiment, the charging point 124 is capable of establishing the communication link 20 with the EV 110 to receive the EV credentials and it also comprises a communication link 22 to provide the EV credentials to the charging station operator 122. Alternatively, a credential transfer unit similar to the credentials transfer unit 128 can be provided at the charging station 120 so that the EV 110 can transfer the EV credentials data to the charting station operator 122 through a communication link similar to communication link 24. In a further embodiment, the credentials transfer unit 128 is capable of receiving both, the conjugated user credentials as well as the conjugated EV credentials, as well as to provide them to the charging station operator 122. The Charging Station Operator 122 provides the conjugated EV credentials and the conjugated user credentials to the service provider 140 through communication link 26.

The service provider 140 comprises a conjugated validation processing unit 142 and a reflexive processing module 148 that carries out the validation of the respective conjugated credentials from the EV 110 and the user 130 in order to approve the transaction by delivering the authorization message through connection 16. The detailed description on the authorization that is carried out by the conjugated validation processing unit 142 and the use of the reflexive processing module 148 will be given in reference to FIG. 3. As in the description of the embodiment of FIG. 1, the charging station operator 122 receives an authorization message from service provider 140 through connection 16, which allows the charging station operator 122 to authorize the battery charging operation 10a by issuing a charging instruction 12a through communication link 12 to the power supply 123. The power supply 123 provides the electrical charge through electrical connection 11 to the charging point 124 and the charging point 124 transfers the electrical charge through the electrical connection 10 to the EV 110.

If the subscription account of the user 130 requires the service provider 140 to validate or directly charge a credit card related to the user 130, such request and respective authorization is managed through communication link 18 between the service provider 140 and the financial institution 150.

Figure 3:
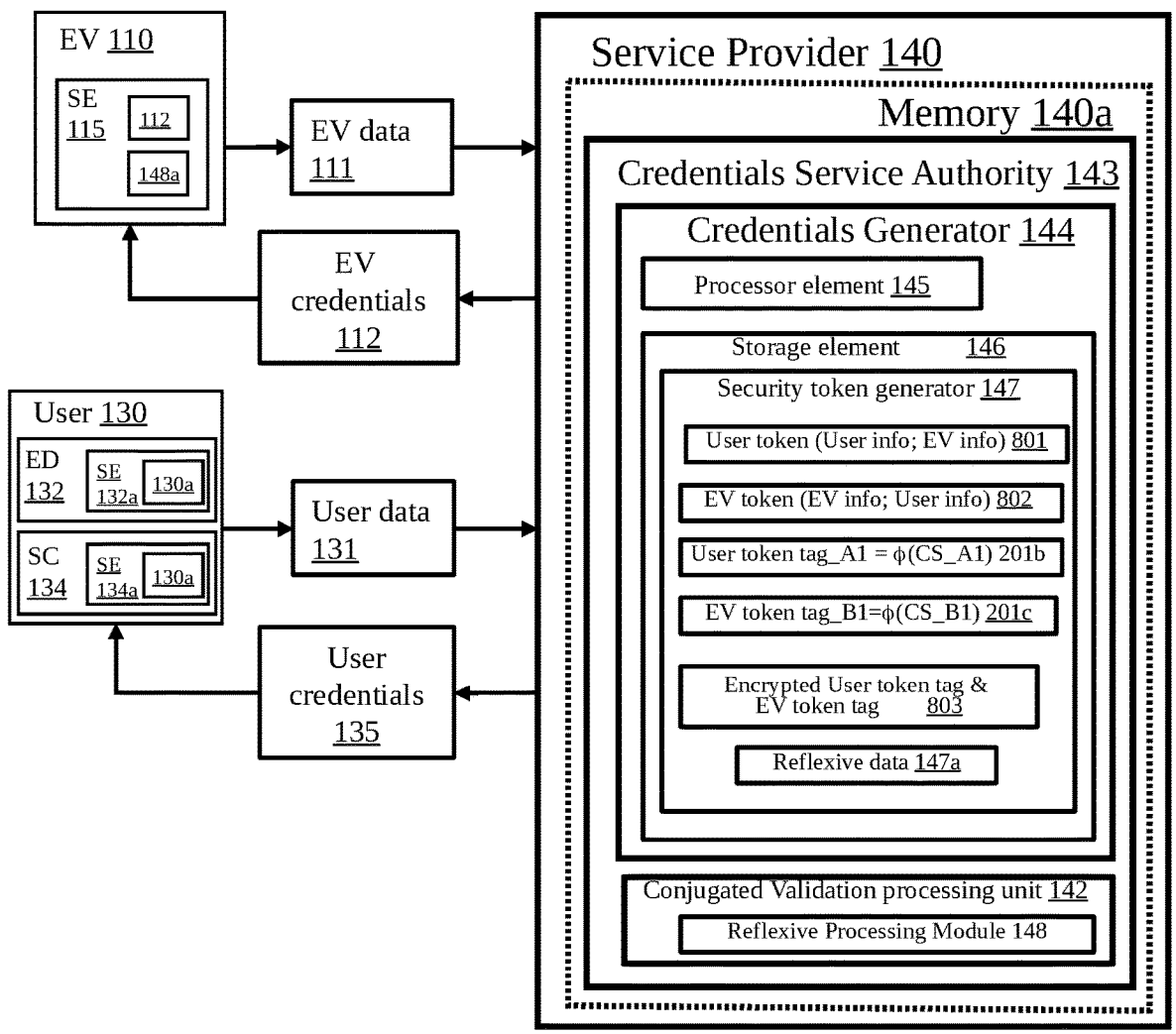
FIG. 3 illustrates a registration stage, including generation of credentials for the user and the electric vehicle, with a more detailed view of the service provider functions.

FIG. 3 shows an additional embodiment 200b in accordance with the present invention, illustrating a registration stage, where generation of the credentials for the user 130 and the EV 110 is explained. In order to be able to generate the conjugated credentials for both, the user 130 and the EV 110, a subscription or account has to be created with the service provider 140. This step is generally performed prior to requesting a charging operation 10a. The user 130 provides its data (user data 131) to the service provider 140. Service provider 140 contains, among other elements, a credentials service authority 143 which comprises a credential generator 144. The credential generator 144 further comprises a processor element 145, as well as a storage element 146. The storage element is either a memory device or circuitry (e.g. a latch) that can store information either temporarily or for longer time periods, for example a flash memory device, a hard drive magnetic disk, a solid-state drive, a dynamic random access memory, a static random access memory, etc. In one embodiment, the storage element 146 stores a security token generator 147 that when executed by the processor element 145, and by using the user data 131 and EV data 111 generates respective tokens that will be used by the credentials generator 144 to generate the user credentials 135 and EV credentials 112.

Credentials service authority 143 at the service provider 140 is responsible for generating the user credentials 135 and the EV credentials 112 which comprise tokens and for constructing an enrolling entity, a cross-related token having tuples {Subject, Pair}. In this description, the terms token and token tag are used interchangeably. In one embodiment, the user credentials 135 comprises a user ID related to the user data 131 as a subject and the EV ID related to the EV data 111 as a pair, e.g. user token (user related info, EV related info) 801. In a similar fashion the EV credentials 112 comprise an EV ID related to the EV data 111 as a subject and the user ID related to the user data 131 as a pair, e.g. EV token (EV related info, user related info) 802. The pairs of information are used to generate a user token and an EV token respectively. The user token is different from the EV token. The user credentials 135 are then transmitted through a communication link to the user 130 as data to be stored in either the ED 132 or SC 134 using a communication channel as previously described. In a similar fashion, the EV credentials 112 are transmitted through a communication link to the EV 110 to be stored in an on-board storage element. In one embodiment, the communication link for transmitting the EV credentials 112 can be similar to communication link 20, 22 and 26 between the EV 110 and the service provider 140 of FIG. 2. In one embodiment, the communication link for transmitting the user credentials 135 can be similar to communication link 13, 14, 24 and 26 between the ED 132 or SC 134 of the user 130 and the service provider 140 of FIG. 2.

Figure 4A:
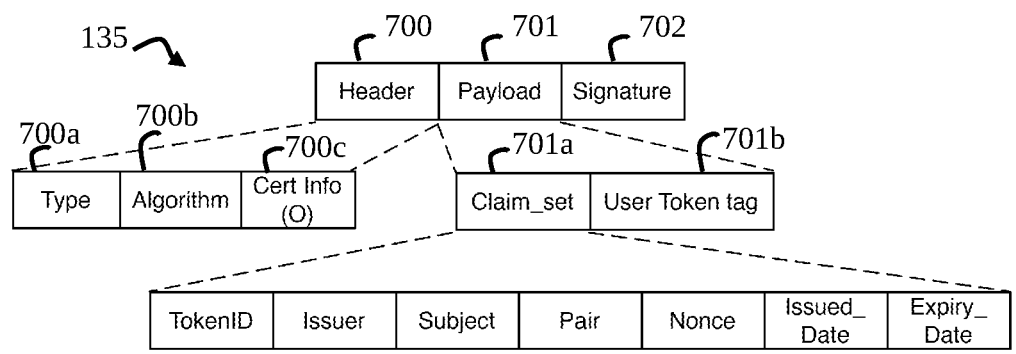
FIG. 4a shows data format for a token of an embodiment of the invention involving a single user of an electric vehicle.
Figure 4B:
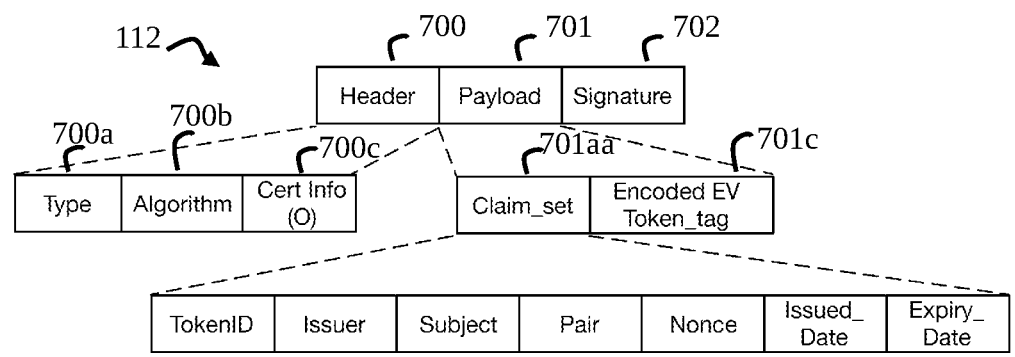
FIG. 4b shows data format for the web-based token of another embodiment of the invention involving an electric vehicle.

FIGS. 4A and 4B disclose one possible structure of the user credentials 135 and the EV credentials 112 respectively. FIG. 4A shows one embodiment of the user credentials 135. User credentials 135 are formed by a series of characters that comprise a header 200, a payload 201 and a signature 202. In this embodiment, the header 200 can be similar to a JavaScript Object Notation (JSON) Web Token. JSON can be referred to as an open-standard file format that uses human-readable text to transmit data objects having attribute-value pairs and array data types (or any other serializable value). JSON-based open standard is described in RFC 7519 document cited in the in the Information Disclosure Statement for this application and may be used, for example, for creating access tokens that assert a number of claims.

The header 200 can comprise a type 700a, an algorithm 700b, and it may contain certificate information 700c. In this embodiment, the payload 701 is comprised of at least a claim set 701a, which can include the following claims: {TokenID, Issuer, Subject, Pair, Nonce, Issued date, Expiration date}. In case of the user credentials 135, the payload also comprises a user Token_tag 701b, which will be later described. The signature 702 is constructed by signing the header and the payload with help of either a secret (with HMAC) or a private key (with RSA or ECC). HMAC refers to a specific type of message authentication code (MAC) involving a cryptographic hash function and a secret cryptographic key. It may be used to simultaneously verify both the data integrity and the authentication of a message, as with any MAC. RSA (Rivest-Shamir-Adleman) is one of the first public-key cryptosystems and is widely used for secure data transmission. In such a cryptosystem, the encryption key is public and it is different from the decryption key which is kept secret (private). Elliptic-curve cryptography (ECC) is an approach to public-key cryptography based on the algebraic structure of elliptic curves over finite fields. ECC requires smaller keys compared to non-ECC cryptography (based on plain Galois fields) to provide equivalent security.

FIG. 4B shows one embodiment of the EV credentials 112. Similar numbers refer to similar objects as previously described. EV credentials 112 are formed by a series of characters that comprise a header 700, a payload 701 and a signature 702 in a similar fashion as the user credentials 135, with the difference that on payload 701, element 701aa is a claim set for the EV, and element 701c is an encoded EV Token_tag_Enc, which has the reflexive characteristics that has been explained above.

Figure 10A:
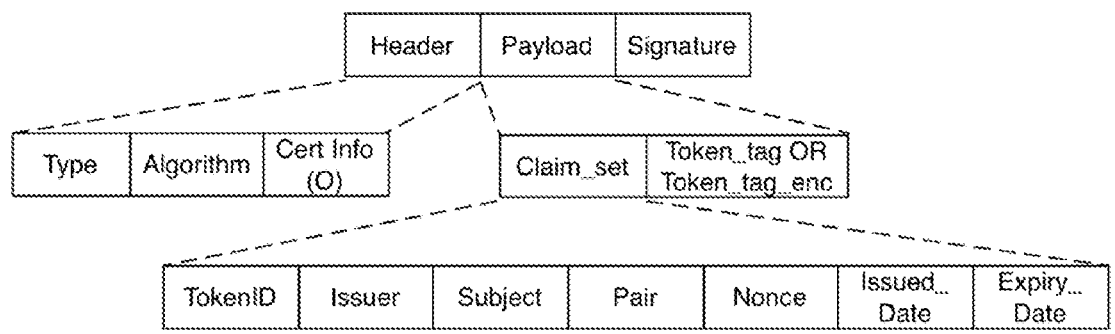
FIG. 10a shows data format for a token of an embodiment of the invention involving a single user of an electric vehicle.
Figure 10B:
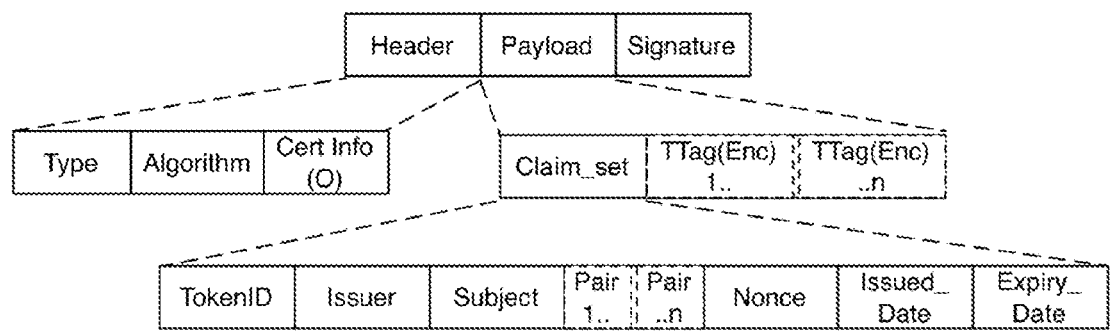
FIG. 10b shows data format for the web-based token of another embodiment of the invention involving multi users of an electric vehicle.

FIGS. 10a and 10b show data formats for a token of an embodiment of the invention involving a single user of an electric vehicle and involving multi users respectively.

The information in the token can be validated and trusted, since it is digitally signed. In one embodiment, the token is renewed in periodic manner to thwart replay attacks.

Figure 5A:
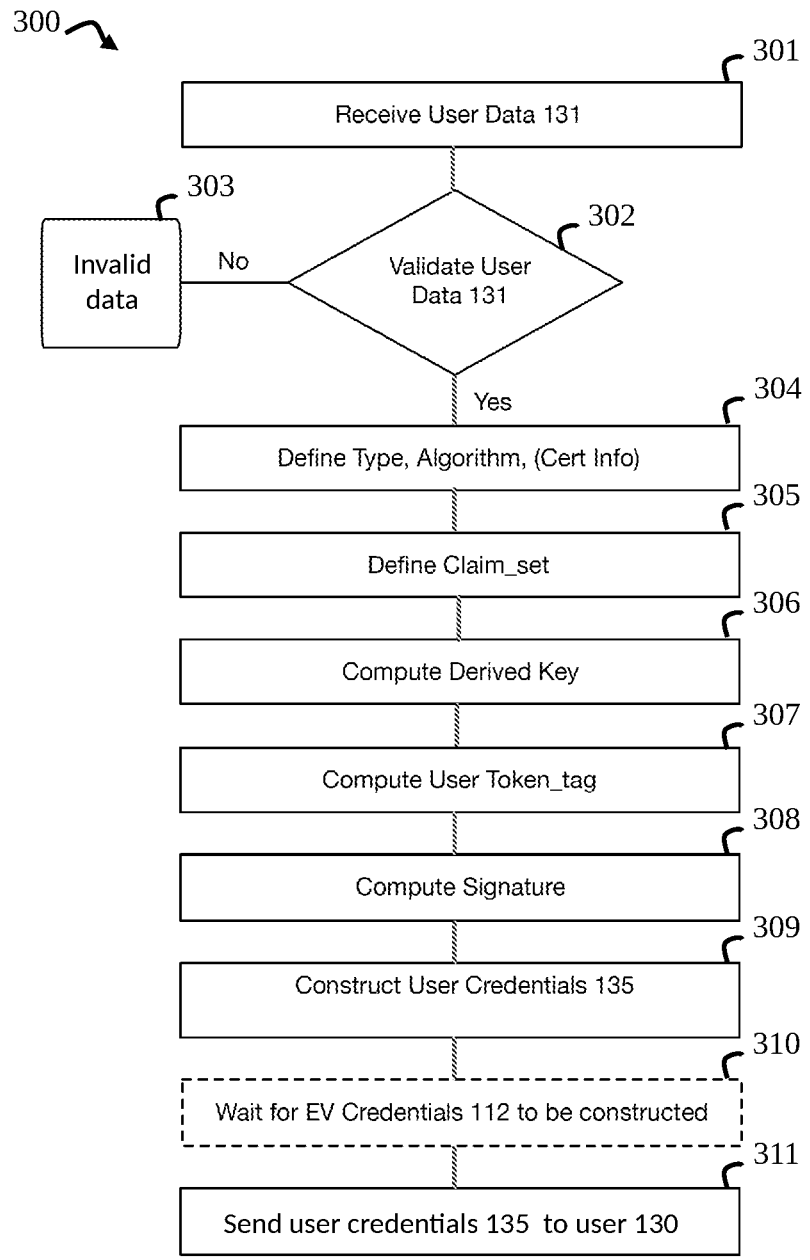
FIG. 5a shows a flowchart of a method for generating a user credentials.
Figure 5B:
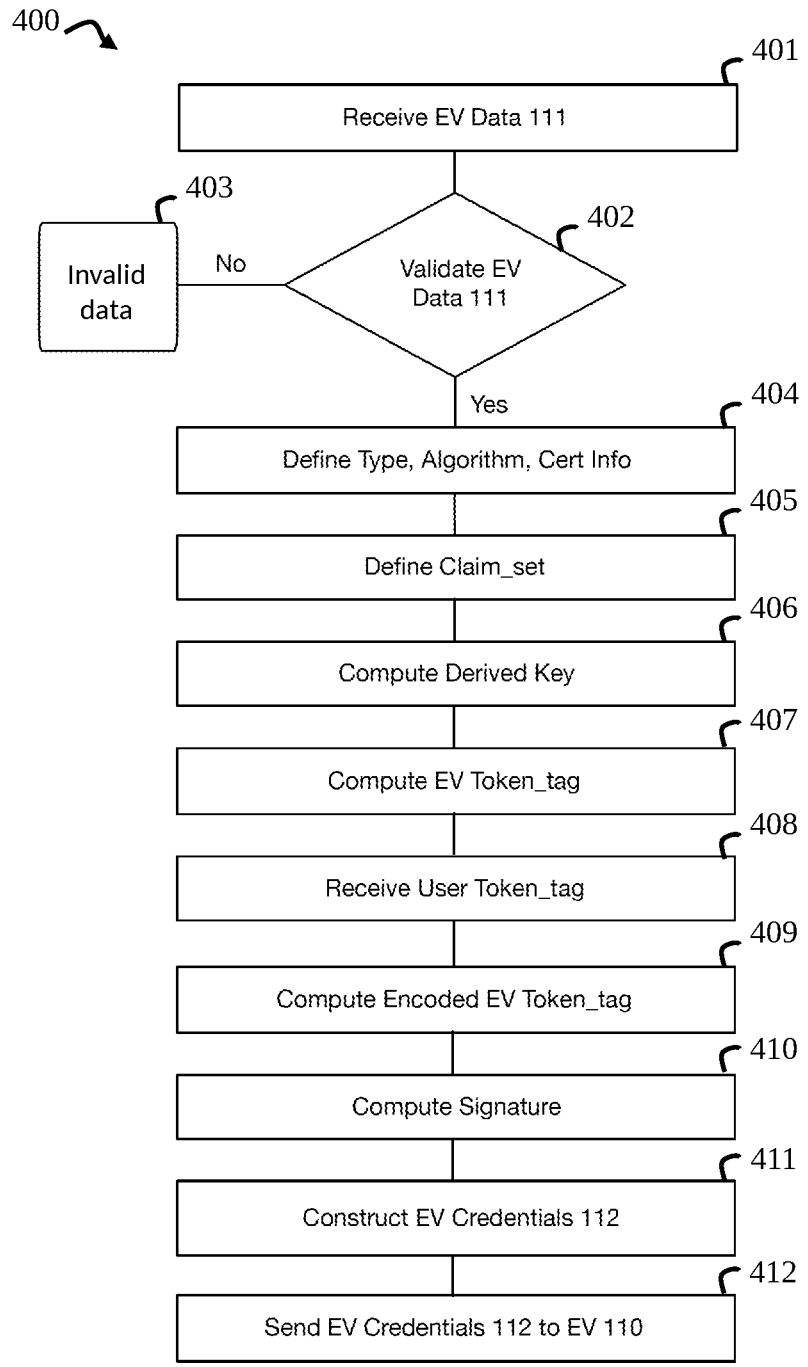
FIG. 5b shows a flowchart of a method for generating EV credentials.

FIGS. 5A and 5B describe a method to generate the user credentials 135 and EV credentials 112, respectively. This method cryptographically binds the participating entities (user 130 and EV 110 and their respective pieces of data, namely user data 131 and EV data 111) together so that this binding can be easily verified by a third party. This method comprises combining a cryptographic hash function (i.e. keyed MAC) and an encryption scheme which can employ a reflexive function, for example an XOR operation, in such manner that each participating entity contributes for an individual hashed value using a keyed message authentication code (MAC).

In one embodiment, the reflexive function can have the following property: if $f(a, b)=c$, then $f(a, c)=b$. More generally, if $f(x\_1, x\_2, \ldots, x\_i-1, x\_i, x\_i+1, \ldots x\_n)=y$, then $f(x\_1, x\_2, \ldots, x\_i-1, y, x\_i+1, \ldots, x\_n)=x\_i$. For instance, the reflexive function may include XOR operation.

In a subsequent step, these hashed values are encrypted (see also box 803 in FIG. 3) using exclusive OR (XOR) operation to produce cipher text based on the data provided by both entities, in this case, user data 131 and EV data 111. In the present method, a Token_tag is formed using a keyed MAC algorithm. The credentials service authority 143 is responsible for creating the user Token_tag 201b and EV Token_tag 201c for the user 130 and EV 110 respectively. Thus, during generating individual specialized tokens for participating entities (i.e. EV user and EV), the CSA creates a user Token_tag 201b that is derived as HMAC(SK, CS1_U), where SK is a derived key specific to the user and CS1_U is a claim specific to the user. The EV Token_tag is derived as HMAC(SK1, CS1 EV), where SK1 is a derived key specific to the EV and CS_EV1 is a claim specific to the EV.

Another embodiment of the mathematical operation that can be used for the generation of the token tags for both entities (user and EV), is a cryptographic hash function, which is designed to take a string of any length as input and produce a fixed-length hash value. For instance, complying with secure hash algorithms 2 or 3 (e.g. SHA2, SHA3). Since the cryptographic hash function may only ensure message integrity, a Message Authentication Code (MAC) can be used in order to achieve both integrity and authenticity. Hashed Message Authentication Code (HMAC) is a specific type of MAC involving a cryptographic hash function and a secret key. For instance, HMAC-SHA2, HMAC-SHA3.

Furthermore, one of the credentials (either the user or EV tokens) is further transformed to generate a unique token that represents an encoded combination of both, the user token and the EV token as a conjugated token tag.

In one embodiment, the user Token_tag and the EV Token_tag are combined and encoded to form the encoded EV Token_tag (EV Token_tag_enc). In one embodiment, the credentials service authority 143 constructs the encoded EV Token_tag (EV Token_tag_enc) 201c using the XOR function to combine the user and EV token tags, e.g. XOR(user Token_tag, EV Token_tag). Finally, the encoded EV Token_tag_Enc 201c is used to generate the EV credentials 112.

As a summary of the reflexive characteristics that the data conforming the encoded EV Token tag (EV token_tag_enc) 201c, the following method is described:

| For A1 | For B1 |
|---|---|
| Token tag_A1 = $\phi$(CS_A1) | Token tag_B1 = $\phi$(CS_B1) |
| Token tag_A1 in Tok_A1 | Token_tag_Enc_B1 = $\bar{\iota}\phi$Token_tag_A1, Token_tag_B1) |
| | Token_tag_Enc_B1 in Tok_B1 |

Here, A1 and B1 are two entities that are associated to each other, for example, A1 can represent the user or a device of the user and B1 can represent the electric vehicle EV. In the same example, Token_tag_A1 in Tok_A1 indicates storing of the Token_tag_A1 in a storage element of an electronic device or smart card of the user, while Token_tag_Enc_B1 in Tok_B1 indicates storing the encoded Token_tag_Enc_B1 in a storage element of the electric vehicle. In an embodiment, the Tok_A1 is a representation of one of the credentials of entity A, while Tok_B1 is a representation of the credentials of entity B1. As can be understood by a person of ordinary skill in the art, the two entities could represent other types of entities that can be associated among themselves or they can be interchanged. In one further example, A1 represents the EV while B1 represents the user.

To perform the validation operation at any Entity (X), the following operations are performed.

Token_tag_A1 and Token_tag_Enc_B1 is obtained or received from Tok_A1 and Tok_B1 respectively;

Token_tag_B1'=$\phi$(CS_B1);

Token_tag_B1=$\varphi$(Token_tag_A1, Token_tag_Enc_B1);

Token_tag_B1=Token_tag_B1';

where $\phi$ is Cryptographic Hash Function (CHF). Most CHFs are designed to take a string of any length as input and produce a fixed-length hash value, for instance SHA2, SHA3.

$\varphi$ is Reflexive Function. Such a function shall have the following property: if $f(a, b)=c$, then $f(a, c)=b$. More generally, if $f(x\_1, x\_2, \ldots, x\_i-1, x\_i, x\_i+1, \ldots x\_n)=y$, then $f(x\_1, x\_2, \ldots, x\_i-1, y, x\_i+1, \ldots, x\_n)=x\_i$. An example of reflexive function is XOR operation.

As the CHF may only ensure message integrity, a Message Authentication Code (MAC) can be used in order to achieve both integrity and authenticity. Hashed Message Authentication Code (HMAC) is a specific type of MAC involving CHF and a secret key. For instance, HMAC-SHA2, HMAC-SHA3.

In a further example of yet another algorithm, using a Key Derivation Function (KDF) that yields derived keys for A and B as follows: K_$\alpha$||K_$\beta$; where, K_$\beta$ is a shared key between {S and X_1, X_2, . . . , X_n}. And $\phi$_K_$\alpha$ and $\phi$_K_$\beta$ are HMAC for A and B respectively.

Token_tag_B1' defines a valuation data which is generated in order to be compared with the stored identification data of one of the entities, in this example, B1. It is noted as well that the entity to be compared against the valuation data is the entity that stored the encoded token tag, namely, Token_tag_Enc thanks to the reflexive characteristics of the data comprising the Token_tag_Enc.

The credentials and token generation involve:

| For A1 | For B1 |
|---|---|
| Token_tag_A1 = ϕ_K_α(CS_A1) | Token_tag_B1 = ϕ_K_β(CS_B1) |
| Token_tag_A1 in Tok_A1 | Token_tag_Enc_B1 = φ(Token_tag_A1, Token_tag_B1) |
| | Token_tag_Enc_B1 in Tok_B1 |

Validation Operation at X

Token_tag_A1 and Token_tag_Enc_B1 is obtained from Tok_A1 and Tok_B1 respectively;

Token_tag_B1'=ϕ_K_β(CS_B1);

Token_tag_B1=φ(Token_tag_A1, Token_tag_Enc_B1);

Token_tag_B1=Token_tag_B1'.

Similar to the previous method described above, the Token_tag_B1' comprises a valuation data which is generated in order to be compared with the real identification data of one of the entities thanks to the reflexive characteristics of the data comprising the Token_tag_Enc.

FIGS. 5A and 5B describe two embodiments of the methods used in the generation of the user credentials 135 and EV credentials 112. In FIG. 5A, the method 300 starts by receiving the user data 131 in step 301. The user data 131 is validated in step 302 and checked for accuracy and consistency. If the credentials are deemed invalid, a message indicating that the credentials cannot be generated because of "invalid data" 303 is sent to the user 130. If the user data 131 is deemed valid, the method proceeds to define a type, algorithm and certificate information to be used in step 304. Subsequently, the claim set is defined on step 305 and the derived key is computed in step 306. With all the information previously calculated, the user token tag is calculated in step 307. On step 308, the signature is computed and finally the user credentials 135 are constructed in step 309. At this point, the optional step 310 can include the temporary storage of the user credentials 135 for a period of time, to allow for the calculations and construction of the EV credentials 112 to be constructed. Finally, on step 311, the user credentials 135 are sent to the electronic device of the user (ED 132) or the smart card (SC 134) of user 130 for their storage. Optionally, the message 303 is communicated to the operator of a charging station so the operator knows of a problem with the data provided by the user 130.

In FIG. 5B, the method 400 starts by receiving the EV data 111 in step 401. The EV data 111 is validated in step 402 and checked for accuracy and consistency. If the credentials are deemed invalid, a message indicating "invalid data" 403 is sent to the user 130. If the EV data 111 is deemed valid, the method proceeds to define a type, algorithm and certificate information to be used in step 404. Subsequently, the claim set is defined on step 405 and the derived key is computed in step 406. With all the information previously calculated, the EV token tag is calculated in step 407. In step 408, the signature is computed. In this embodiment, the user token tag calculated in step 307 of FIG. 5A is received in step 408. In step 409, the encoded EV token tag is calculated by conjugating the user token tag and the EV token tag using a reflexive function, for example, using XOR (user token tag, EV token tag). In step 410 the signature part is computer and the EV credentials 112 are constructed in step 411. Finally, on step 412, the EV credentials 112 are sent to the EV 110 for their storage.

Figure 11A:
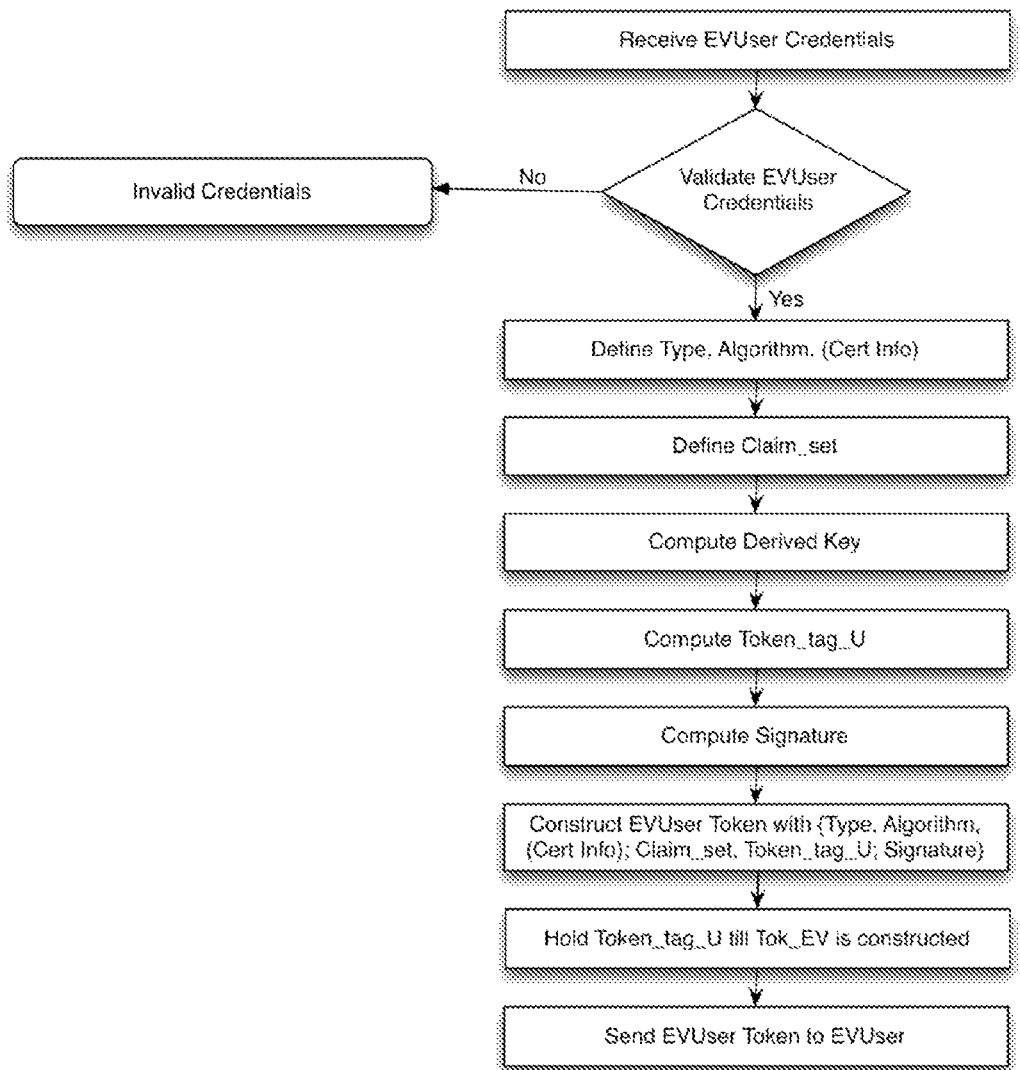
FIG. 11a shows a flowchart for a token generation for an EV user.
Figure 11B:
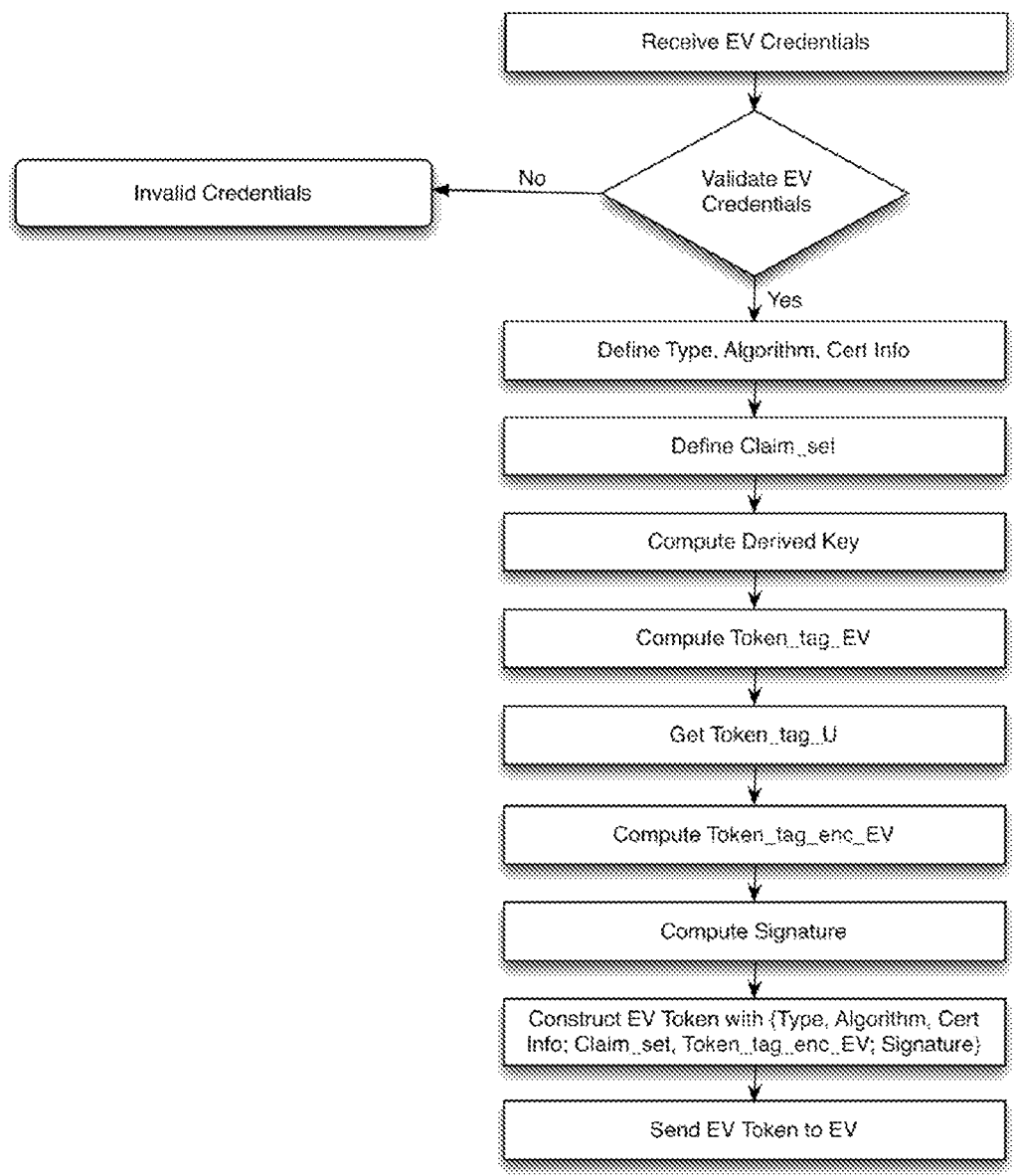
FIG. 11b shows a flowchart for EV token generation with single user.

FIGS. 11a and 11b depict flowcharts for a token generation for an EV user, and EV token generation with single user of the EV respectively.

Figure 6A:
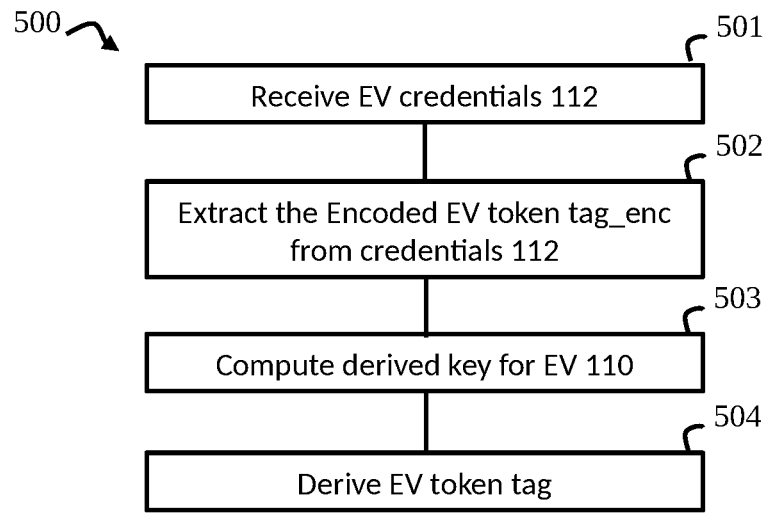
FIG. 6a shows a flowchart of a method for deriving an EV token tag.
Figure 6B:
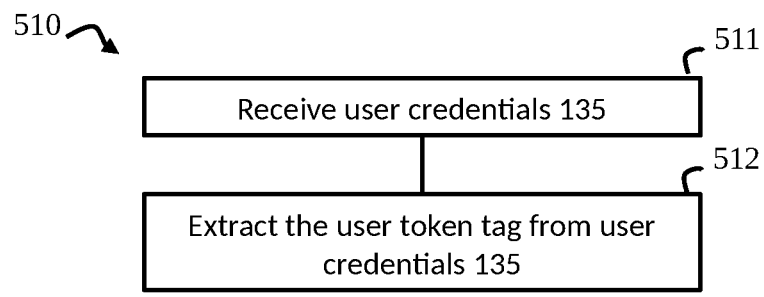
FIG. 6b shows a flowchart of a method for extracting the user token tag.
Figure 6C:
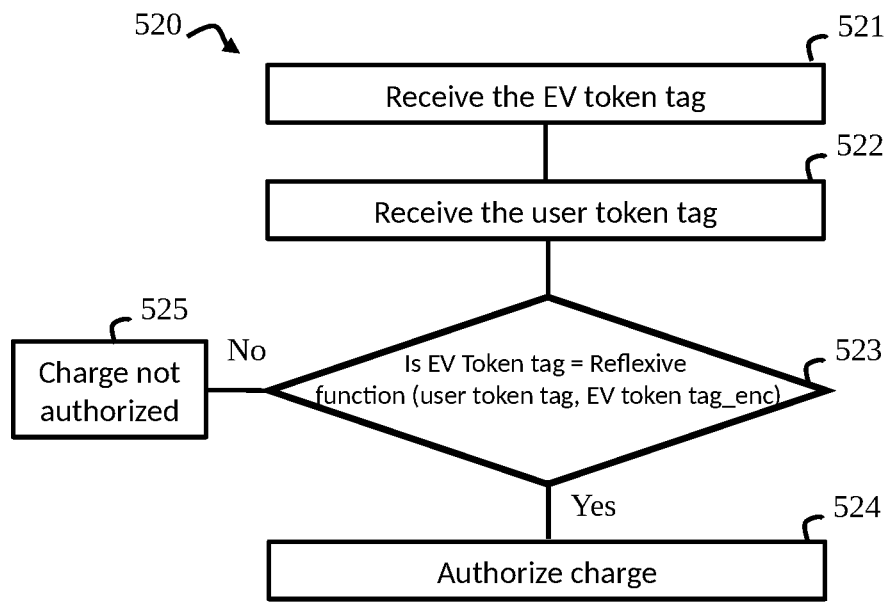
FIG. 6c shows a flowchart of a method of authorizing the charging operation using conjugated credentials.

The method for the authentication and authorization that is carried out in order to charge the batteries of the EV 110 by a user 130 is depicted in FIGS. 6A, 6B and 6C and that is carried out by the Conjugated Validation Processing Unit 142 of the Credentials Service Authority 140 of the Service Provider 140 as shown in FIG. 3.

FIG. 6A describes method 500 which includes of the Conjugated Validation Processing Unit 142 receiving the EV credentials 112 in step 501. In step 502, the conjugated validation processing unit 142 extracts the encoded EV token_tag_enc from the credentials 112 by parsing the information contained in the credentials. With the information contained in the header, payload and signature of the credentials 112, the processing unit extracts the encoded EV token tag_enc and computes the derived key for EV 110 in step 503. In step 504, the Conjugated Validation Processing Unit 142 proceeds to derive the EV token tag. It is particularly noted that, since the EV credentials 112 contain all the relevant information on how to derive the EV token tag, there is no need for the service provider to maintain a database with such information and that no external database needs to be consulted in the validation process.

FIG. 6B describes method 510 which consists on the Conjugated Validation Processing Unit 142 receiving the user credentials 135 in step 511. In step 512, the conjugated validation processing unit 142 extracts the user token tag from the user credentials 135 by parsing the information contained in the credentials. With the information contained in the header, payload and signature of the credentials 112, the processing unit can extract the user token tag.

FIG. 6C describes the method 520 where the conjugated authentication and authorization takes place. Step 521 comprises receiving the EV token tag that was derived on step 504. Step 522 comprises receiving the user token tag from step 512. Step 523 comprises comparing if the EV token tag is equal to the result of the XOR operation: XOR(user token tag, EV token tag_enc). It is noticed that the XOR operation: XOR(user token tag, EV token tag_enc) will deliver the value "user token tag" if the EV token tag_enc was calculated for the rightful user 130 of the EV 110. If the result of the comparison is yes, then step 524 is carried out and the charge is authorized. If the result of the comparison on step 523 is different, then the charge is not authorized in step 525.

Although in the previously described embodiments, the encoded tag was shown to be included on the EV credentials 112, it will be evident to someone of ordinary skill in the art that the same method can be implemented by applying an encoded tag in the user credentials 135 in a similar way as the one described in the previous embodiment without departing from the invention.

Although in the previously described embodiments, an XOR function has been described to perform the generation of the encoded EV Token_tag_Enc, and then using the XOR function again for the authorization of the transaction, other reflexive functions can be used by persons of ordinary skill in the art without departing from the invention.

Furthermore, if a plurality of users 130a, 130b . . . 130n are to be authorized to charge the EV 110, the generation of the EV credentials 112 would require to combine the credentials of all the users, for example, the EV credentials 112 would contain in the encoded EV token tag_enc the encoded EV token_tag_enc a for user 130a, encoded EV token_tag_enc_b for user 130b, and encoded EV token_tag_enc n for user 130n). In a similar way, the comparison carried out on step 523 would need to compare all the existing encoded EV token tag_enc of each user to the user token tag provided for authorizing the charge.

Figure 7:
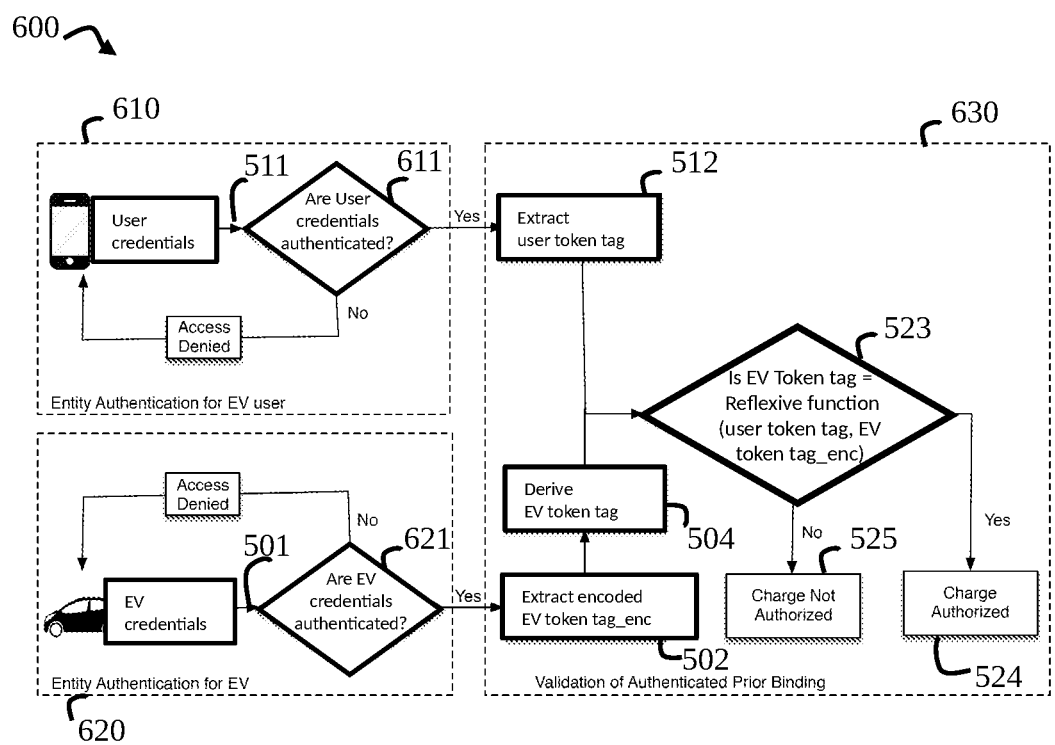
FIG. 7 flowchart of a method of authorizing the charging operation using conjugated credentials.

FIG. 7 shows a diagram 600 with another embodiment of the method described in FIGS. 6A, 6B and 6C with the same numerals used for the same steps. Here, element 610 shows an EV user sharing the user credentials, when received in step 511 and then optionally, the credentials can be authenticated in step 611. If the user credentials do not conform with the specific format that is allowed by the service provider, the access is denied. If the user credentials are authenticated at step 611, the process continues in a similar fashion to the method described in FIG. 6B and the user token tag is extracted as in step 512. Element 630 shows the EV credentials being received at step 501 similar to the process described in FIG. 6A. Element 620 shows the EV sharing the EV credentials, when received in step 501 and then authenticated in step 621. Optional step 621 can verify if the EV credentials are authenticated and if they aren't, access is denied. If the EV credentials are authenticated, a process similar to that described in FIG. 6A takes place where the encoded EV token tag_enc is extracted in step 502 and then the EV token tag is derived in step 504. Similar to the process described in FIG. 6C, the EV token tag is evaluated in step 523 to see if it's equal to the result of the XOR operation: XOR(user token tag, EV token tag_enc), and if the answer is yes, the charge is authorized in step 524, and if not, the charge is not authorized in step 525.

In a further embodiment, the conjugated authentication and authorization (CAA) method of the embodiments of the invention can further comprise an entity authentication of the participating entities and authenticated prior binding (APB) on both. This means that prior to sending the user and EV credentials to the service provider 140, each credential is reviewed individually to confirm that the data structure is consistent with the format of the credentials. The review of the format of the credentials can be performed in the charging station operator 122. In an embodiment, the charging station operator 122 is a computer system or a processor module. If the credentials format is correct, the credentials are sent from the charging station 120 to the service provider 140 for further validation and authorization in a normal fashion. With a valid CAA, permission is granted for the charging process; only then shall the EV users be able to perform charging activities for their EVs in an EV charging network.

The CAA method yields comprehensive multi-level authentication, thus it provides more fine-grained access control for charging or discharging the particular EV by the specified EV user. Thus by employing the CAA method of the embodiments of the invention, adversaries would not have access for charging operation 10a without successfully conducting two level authentication and authorization processes, namely entity authentication and authenticated prior binding (APB).

Since self-contained, cross-related tokens are employed, a lookup table is not necessary, that means, eliminating the need to query the database frequently during charging operation 10a.

When plugged in to the charging station outlet, the credentials of EV can be validated by either the charging station operator or a third-party service provider such that only upon proper validation will the system allow the charging process. However, even with accurate credential validation, the charging station may not know the EV user who has initiated the charging process.

An exemplary system of embodiments of the invention comprises an electric vehicle (EV) and Charging Station Operator (CSO), mobile device (MD) of the EV user, and may also comprise E-mobility Service Provider (EMSP).

In a further embodiment, the Charging Station Operator (CSO) is an entity that manages and operates charging stations. The CSO may not only be based on either conventional plug-in charging or emerging wireless EV charging but also have heterogeneous charging capacities. For instance, in case of conventional plug-in charging, a CSO may have several charging stations equipped with Electric Vehicle Supply Equipment (EVSE) at different locations and a centralized EVSE Controller Center (CC) that can manage and control EVSEs. Whereas in the case of Wireless EV Charging (WEVC), WEVC CSO (CSO-W) may be comprised of distributed charging stations; each charging station may include a pair of a Base Controller Unit (BCU) and a Charging pad (CP). Similarly, WEVC CSO may have a WEVC Controller Center (CC) to manage and control remotely located BCUs. In some embodiments, CSO or CSO-W may have a Master Controller Unit (MCU) to administer EVSEs or BCUs locally; in such cases, only MCU shall have direct communication with EVSE CC or WEVC CC respectively.

Figure 9A:
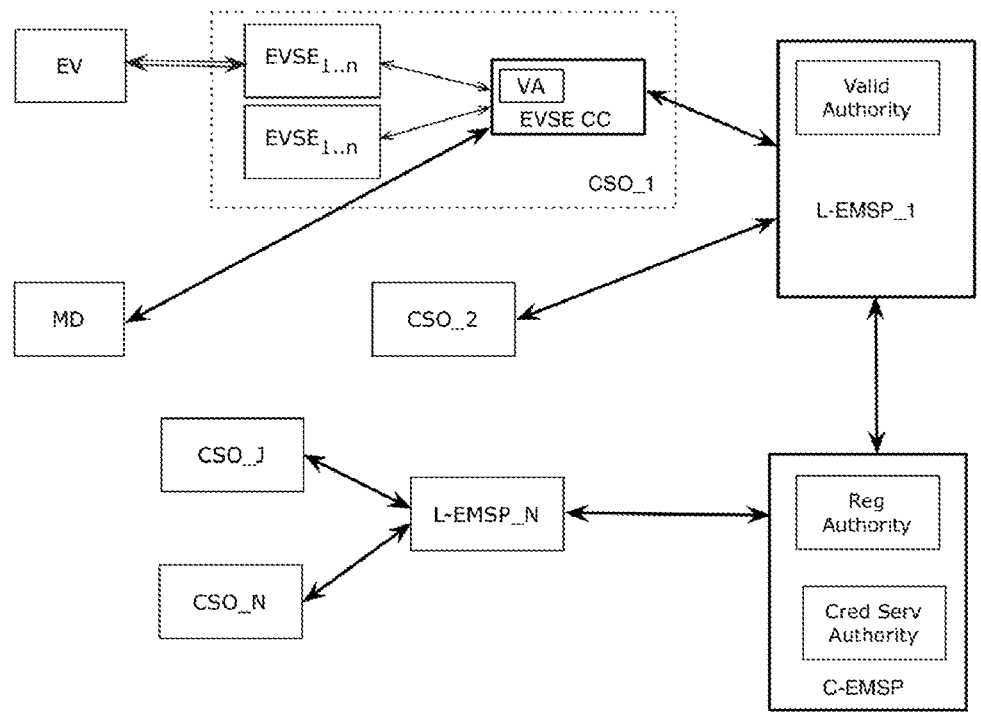
FIG. 9a illustrates a block diagram of a charging system for electric vehicles, for managing and controlling the charging process.

E-mobility Service Provider (EMSP) is responsible for managing the credentials for EV users and respective EVs, as well as their respective charging operations 10a. The EMSP may enable EV users to use charging stations at different CSOs and even cross-border network of charging stations allowing e-mobility roaming. The EMSP comprises core EMSP (C-EMSP) and local EMSP (L-EMSP). Core EMSP may encompass at least several back-end servers such as Application server, Database server and Authorization server, while local EMSP has Application server and Validation server. The Application server comprises a web application server and may include a mobile application server. The local EMSPs are typically placed in a distributed manner such as the cross-border EV charging network, whereas the core EMSPs are usually centrally located. FIG. 9a illustrates a block diagram of a charging system for electric vehicles, for managing and controlling the charging process using either L-EMSP or C-EMSP.

In an embodiment, the CSO and EMSP may be autonomous entities or may belong to the same entity/organization. In any case, there is always an association between the CSO and EMSP. The CSO may be associated with independent EMSP, or several different EMSPs. And the local EMSP (L-EMSP) can serve multiple different CSOs in a certain geographical location.

In such an embodiment, an EV may communicate with an EVSE when a plug-in cord is connected for conventional plug-in EV charging. Conversely, in some instances, the EV may communicate with the EVSE using wireless means such as ZigBee, WiFi, Radio Frequency Identification (RFID), Bluetooth Low Energy (BLE) etc. Likewise, wireless power transfer enabled EV (EV-WPT) communicates with a BCU using wireless technologies including ZigBee, WiFi, RFID, or BLE in order to wirelessly charge at a respective CP.

The network may be a metropolitan-area network (MAN) and/or a wide-area network (WAN), which may include wired (i.e. Power-line communications (PLC), optical fiber) and wireless (i.e. LoRAWAN, 3G/4G, LTE) technologies.

An EV user may use a mobile device (MD) to communicate with EMSP or EVSE CC using mobile applications. With this service, EV users are able to locate, reserve and use any charging stations in the EV charging network. A memory device can be an electronic device, a hand held electronic device, a mobile phone, a tablet or another electronic device with the capacity to transmit and receive data via a mobile network, a cellular network, or using other telecommunication protocol.

In one embodiment of the present invention, several scenarios can be envisioned. One of the scenarios requires that a Long-term certificate (LTCert) is installed in each EV during the vehicle production (i.e., comparable to ISO/IEC 15118 based OEM Provisioning Certificate). It is also required that (Vehicle-to-Grid) V2G public key infrastructure (PKI) is deployed, i.e., V2G Root Certificate Authority (CA) and V2G Subordinate CA are implemented. Thus, an issuing certificate authority (ICA) designated for the E-mobility Service Provider (EMSP) is responsible for issuing Short-term certificates (STCert) to EVs during a certificate installation or bootstrapping process. The LTCert, which has a longer validity period, is used for generating STCert, whereas, the STCert, which has a shorter validity period, is utilized during the authentication and authorization process and token renewal. Similarly, the issuing CA shall also issue a digital certificate to the MD of the EV user during the registration process or registration step.

FIG. 13c illustrates a call flow diagram for token generation at C-EMSP CSA.

In other embodiments, various login methods may be used. For instance, an entity may execute the login sequences for the authentication schemes either using user-created credentials (such as a password, user name, PIN) or other means (such as security tokens, digital certificate, etc.).

The embodiments of the invention describe authentication and authorization methods that may include several actors such as subscriber/claimant, Registration authority (RA), Credentials service authority (CSA) and Validation authority (VA).

A claimant is an entity that claims an identity and thus be a subscriber to certain Credentials service authority (CSA). Thus, the subscriber/claimant exclusively maintains control of his credentials (for example, token), as such credentials are used to authenticate him during the authentication phase.

In an embodiment, the Registration authority (RA) and credentials service authority (CSA) are part of the same entity with separate functions, for instance, RA and CSA are located at the core EMSP. The RA is responsible for verifying the identity of the subscriber during registration step, while the CSA provides the subscriber credentials (i.e. token) to be used in an authentication process. However, it is understood that RA and CSA may be located in a distributed manner.

In one embodiment, the EV user registers with the EMSP and provides his/her relevant personal profile as well as EVs information. For instance, the EV users may have subscription-based accounts (similar to PayPal) with the EMSP, which may be pre-loaded and/or have stored credit card information. Thus, during the charging process, the amount accrued for the charging session shall be deducted from their accounts, whereas during the discharging process, the amount accrued for discharging session shall be deposited into their accounts.

In one embodiment, the Validation Authority (VA) verifies that the subscriber/claimant has ownership and control of the credentials that verifies his/her identity. In this regard, proof of possession (PoP) is a method, in which a claimant authenticates his/her identity to the VA by the use of a credential (i.e. token) and an authentication protocol. The VA may reside at the EVSE CC and/or the L-EMSP.

In an embodiment of the invention, a specialized token-based security is performed in order to provide superior security, scalability and flexibility as well as user convenience. In the token-based authentication and authorization method, the system securely provides an authorization token to the participating entity (i.e., EV and EV user), which can provide authenticity, integrity, non-repudiation and achieve convincingly faster re-authentication. One of the significant benefits of such token-based authentication and authorization is that it shall eliminate time-consuming lookup into the database every time when authenticating the participating entities in the EV charging network. It is especially beneficial for e-mobility roaming, that is, when using charging stations in different areas and from different service providers.

In an embodiment, the token (Tok) of the embodiments of the invention is self-contained and claim-based. This kind of token contains all the required information within itself, and has a set of claims that defines the participating entity, thus, eliminating the need to query the database during charging sessions.

In one embodiment, the token (Tok) has a header, a payload and a signature; similar to a JSON Web Token (JWT). The header at least encompasses a type, an algorithm, and may contain certificate information. In general, the payload is comprised of at least a claim set (CS), which includes the following claims: {TokenID, Issuer, Subject, Pair, Nonce, Issued date, Expiration date}. In case of the EV user, the payload also has Token_tag (TTag), whereas in case of the EV, instead of TTag field, it has Token_tag_enc (TTagEnc). The signature is constructed by signing the header and the payload with help of either a secret (with HMAC) or a private key (with RSA or ECC). The information in the token can be validated and trusted, since it is digitally signed. And the token is renewed in periodic manner to thwart replay attacks.

Credentials service authority (CSA) at the core EMSP is responsible for generating security tokens (Tok) to the user and the EV. In this description, the term token and security token are used indistinctively. And for an enrolling entity, a cross-related token having tuples {Subject, Pair} is constructed. For instance, the user ID (UID) as a subject and the electric vehicle ID (EVID) as a pair are designated in the token of the EV user (Tok_U), whereas EVID as a subject and UID as a pair are designated in the token of the EV (Tok_EV).

Entity authentication is a mechanism, in which a party (i.e. Validation authority) can gain assurance that the identity of another party (i.e. claimant) is same as stated and is actually participating in the authentication process. Entity authentication may be achieved with an authentication tag (AT), which is constructed as a digital signature using a private key of the participating entity. The authentication tag provides authenticity, integrity and non-repudiation for the individual entity. That means, with a valid authentication tag, the VA confirms not only that the request was sent by a particular claimant and was not altered in transit but also that the claimant cannot deny having sent the request.

In an embodiment, Authenticated Prior Binding (APB) is a method to cryptographically bind the participating entities (and their respective pieces of data) together so that this binding can be easily verified by a third party. The APB method is performed by combining a cryptographic hash function (i.e. keyed MAC) and an encryption scheme (for example XOR operation) in such manner that each participating entity contributes for an individual hashed value using a keyed message authentication code (MAC) then these hashed values are encrypted using exclusive OR (XOR) operation to produce cipher text based on both. In the APB method, Token_tag (TTag) is formed using a keyed MAC algorithm. Credentials service authority (CSA) is responsible for creating Token_tag and Token_tag_enc for EV user and EV respectively. Thus, during generating individual specialized tokens for participating entities (i.e. EV user and EV), the CSA creates an EV user Token_tag (TTag_U) that is derived as HMAC(SK, CS1 U), where SK is a derived key. As a Token_tag_enc (TTagEnc) is an outcome of the APB method, the CSA constructs an EV Token_tag_enc (TTagEnc_EV) using XOR(TTag_EV, TTag_U), where TTag_EV is derived as HMAC(SK1, CS1 EV).

Conjugated authentication and authorization (CAA) method of the embodiments of the invention comprises entity authentication of the participating entities and authenticated prior binding (APB) on the both. With a valid CAA, the permission is granted for the charging process; only then shall the EV users be able to perform charging activities for their EVs in an EV charging network.

The CAA method yields comprehensive multi-level authentication, thus it provides more fine-grained access control for charging or discharging the particular EV by the specified EV user. Thus by employing the CAA method of the embodiments of the invention, adversaries would not have access for charging operation 10a without successfully conducting two level authentication and authorization processes, namely entity authentication and authenticated prior binding (APB).

The CAA method is devised to furnish an explicit non-repudiation of the participating entities (i.e. EV user and EV) for the access control to the charging activities. So the authorized EV user would not be able to deny the charging activities for the particular plugged-in EV later on.

Some disclosed embodiments encompass the conjugated authentication and authorization (CAA) with CSO validation authority (VA), where any authorized CSO can validate authentication and authorization process. The CAA with CSO VA procedure may have several benefits over the existing mechanisms. Its foremost advantage is that use of the APB not only provides pre-binding of the participating entities (i.e. EV and EV user) but also guarantees comprehensive authenticity and integrity along with confidentiality. Since the CAA is performed within CSO domain, it can considerably minimize authentication delay. Furthermore, as the CAA is constructed using lightweight cryptographic primitives such as XOR operation, it can provide fast computation as well. The CAA method helps reduce the possibility of active attacks such as man-in-the-middle (MiTM) attacks, masquerading or impersonation attacks, repudiation attacks, replay attacks, and credential exploitation etc. as well as passive attack such as eavesdropping.

Since the credentials for the user and the EV are self-contained, and with the use of cross-related tokens, a lookup table is not necessary. By having self-contained conjugated credentials, the need to query the database frequently during charging operation 10a is eliminated.

In one embodiment, when an EV user desires to charge or recharge his/her EV, only after valid CAA method, he/she shall be able to perform EV charging. During this process, the EV user chooses proper settings (i.e. EVSE CC, mode of payment) in the mobile application. Then an authentication tag (AT_U) is generated at the MD of the EV user as follows: DS(UID, Tok_U) where DS is a digital signature. Subsequently, for every request to the EVSE CC, the MD submits the {Tok_U} along with {AT_U}. Upon receiving {UID, Tok_U, AT_U}, the VA at the EVSE CC validates the authenticity, integrity and non-repudiation of the EV user as well as verifies authenticity and integrity of the given token. The EV is also plugged in to the public charging station outlet, i.e. EVSE, the EV generates an authentication tag (AT_EV) using its private key such that it is the digital signature DS(EVID, Tok_EV) and send {Tok_EV, AT_EV} to the EVSE CC through the EVSE. If the received digital signature is valid, then the VA at the EVSE CC validates the APB by comparing XOR(TTagEnc_EV, TTag_U) with computed TTag_EV. If the result is true, the financial validation process occurs since no financial pre-authorization is provided. Upon legitimate financial validation, the EVSE CC sends a Ready_to_charge message to the MD. Then the EV user is allowed to initiate a charging request. The authentication response is sent along with a charging request to the particular ESVE. That means after a valid CAA process, charging related activities take place with EV user's initiation.

Figure 8:
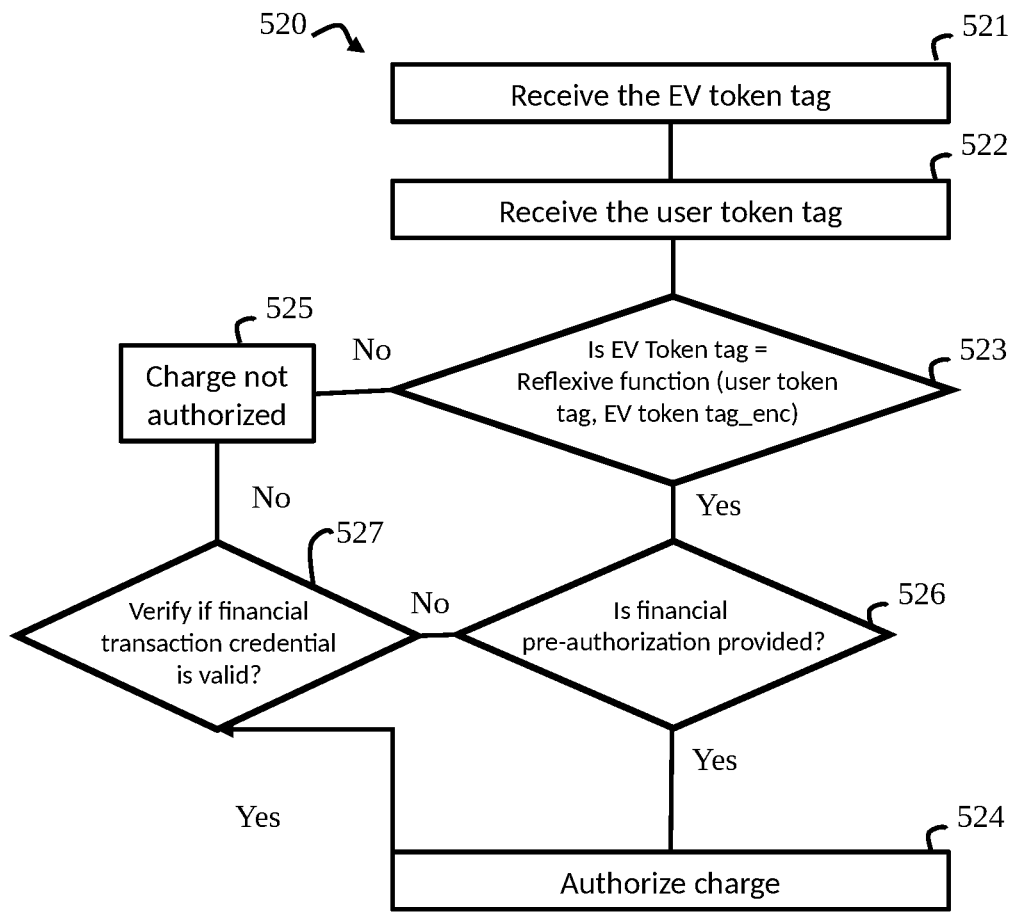
FIG. 8 shows a flowchart of a method of authorizing the charging operation using conjugated credentials when the financial transaction is further authorized.
Figure 12A:
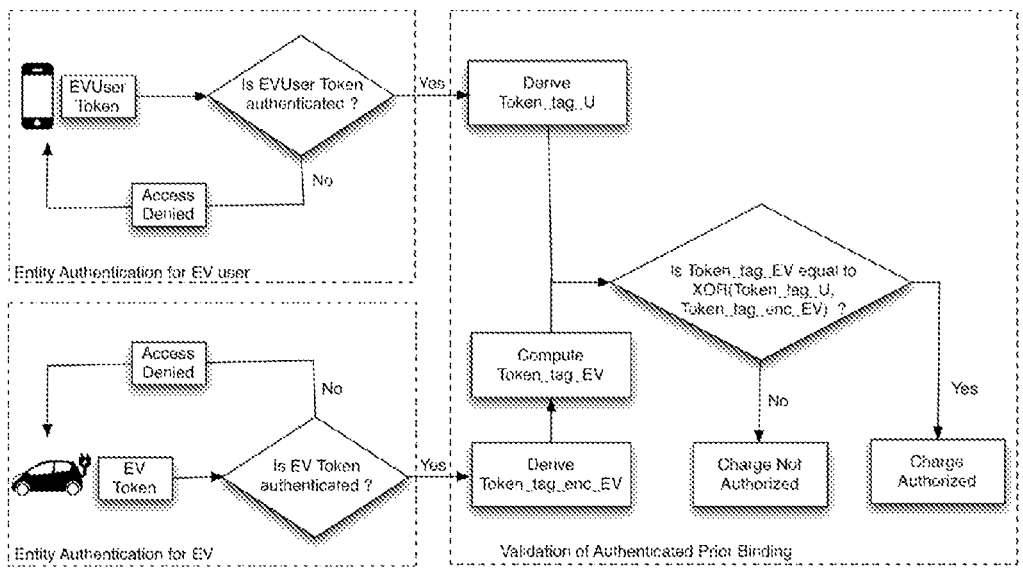
FIGS. 12a and 12b show flowcharts for Conjugated Authentication and Authorization (CAA) method and entity authentication for the participating end entity respectively.
Figure 12B:
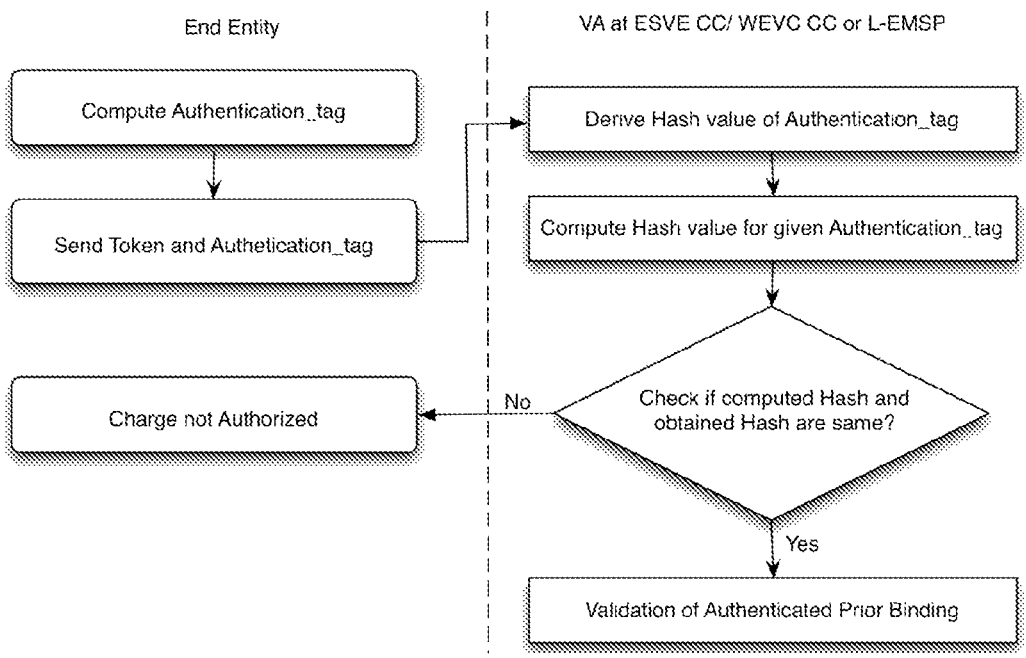
Figure 12C:
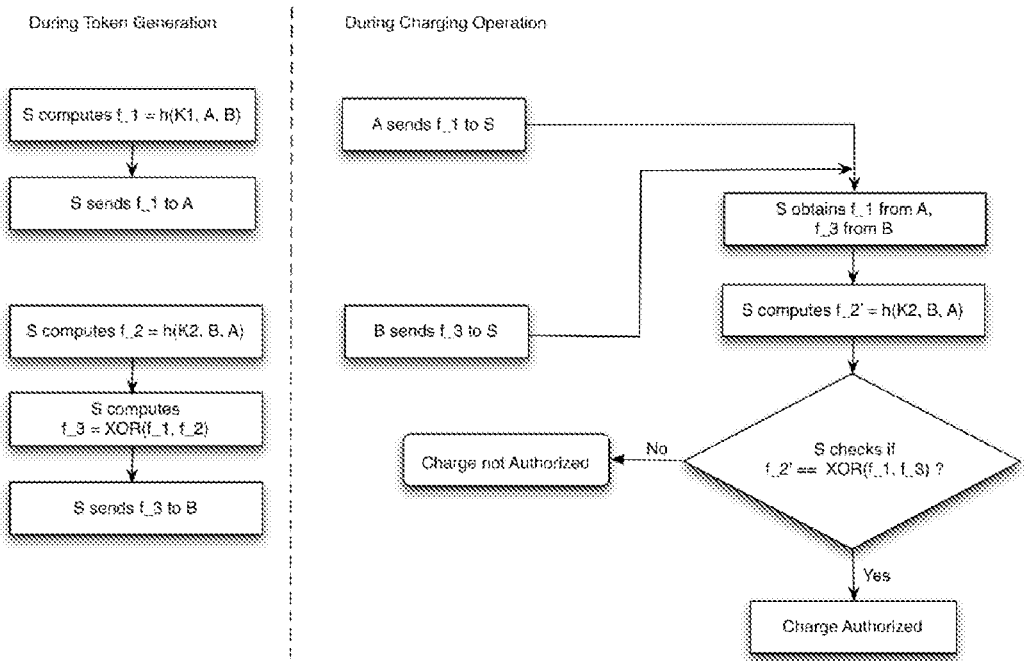
FIGS. 12c, 12d, and 12e illustrate flowcharts for the Authenticated Prior Binding (APB) method, APB validation for a single user, and APB validation for multiuser respectively.
Figure 12D:
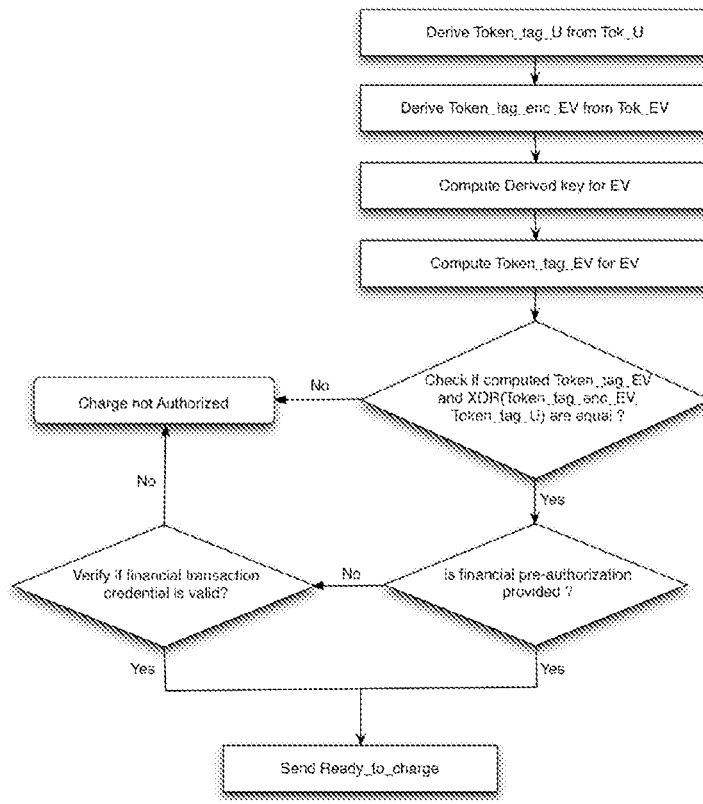

FIG. 8 describes a method based on the description of FIG. 6C, where the financial transaction needs to be executed separately from the validation of the credentials. Same numerals refer to same functions. In addition to the comparison of the tokens in step 523, on step 526 the service operator evaluates if the financial pre-authorization is provided. If the answer is yes, the step 524 is carried away and the charging authorization is provided. If the answer to step 526 is no, on step 527 the verification of the financial transaction credential is performed. If the financial transaction credential is valid, the following step is authorizing the charge on step 524, otherwise, the charge is not authorized as in step 525. FIGS. 12a and 12b show flowcharts for CAA method and entity authentication for the participating end entity respectively. Similarly, FIGS. 12c and 12d illustrate flowcharts for the APB method and APB validation for a single user respectively.

Figure 12E:
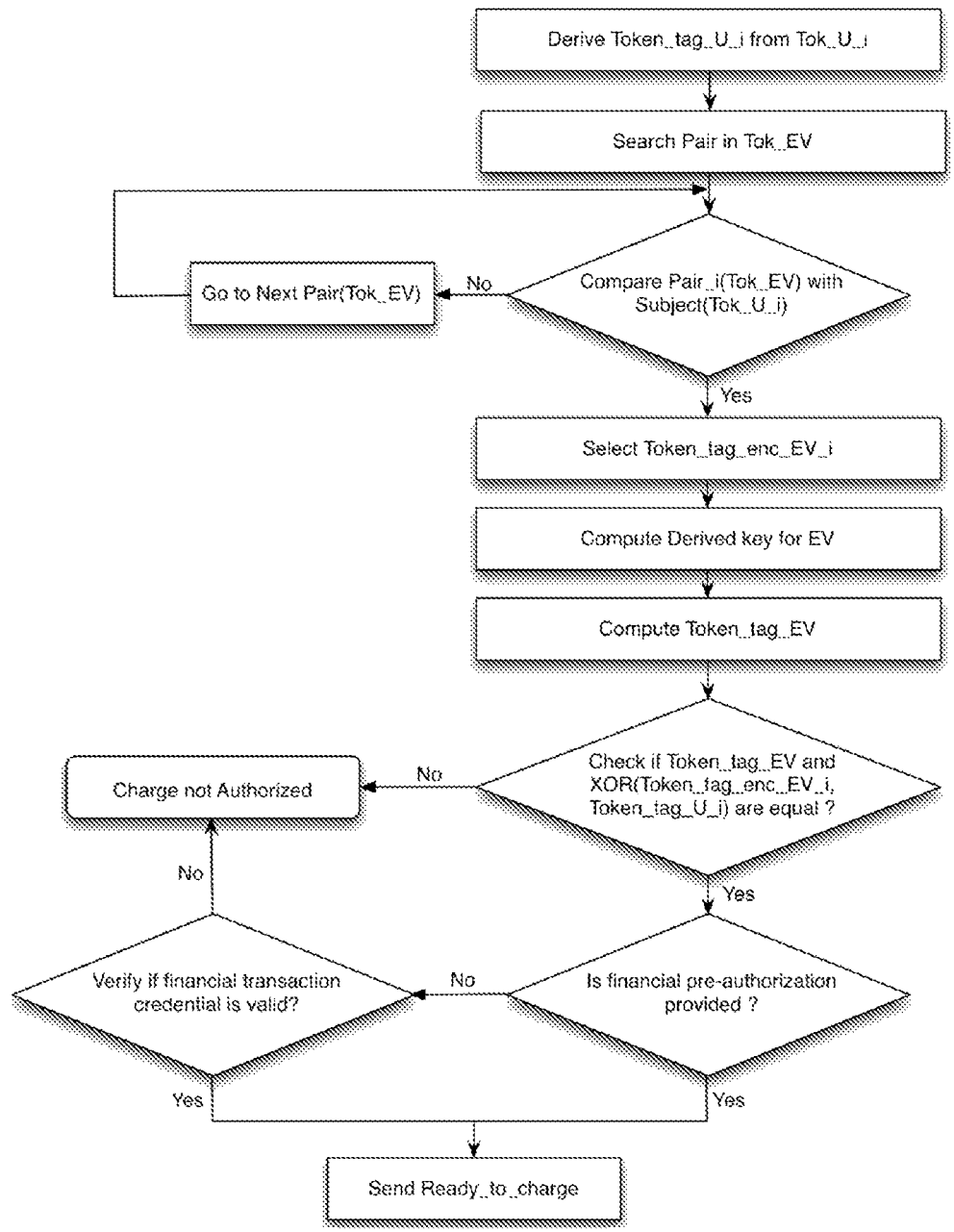

In another embodiment, in order to thwart replay attacks, Challenge Response authentication on the above-mentioned procedure may be appended. In this scenario, the EV shall send a request containing {EVID, Tok_EV}. Upon receiving a request from the EV, the EVSE sends a challenge N along with its ID (EVSEID) to the EV. Then the EV creates a challenge response as digital signature DS(EVID, EVSEID, N, Tok_EV) and an authentication tag (AT_EV) as digital signature DS(EVID, Tok_EV), and then sends them to the EVSE. After valid verification of the challenge response, EVSE forwards {Tok_EV, AT_EV} to the EVSE CC. The remaining process is the same as described above in previous embodiment of the invention. FIG. 12e illustrates a flowchart for APB validation for multi users of the EV.

According to yet another embodiment, the Credentials service authority (CSA) at the core EMSP generates tokens for both the EV user and the EV. During the process, the EV user needs to login to the core EMSP with the MD using his password credentials. Upon successful login, the CSA shall define an EV user claim set (CS1_U), which contains {TokID, Iss, UID, EVID, R, Lifespan_U(ExpDate-IssDate)}. And in order to compute TTag_U as HMAC(SK, CS1_U), it computes a derived key (SK) for the EV user as follows: KDF(R, GPS), where KDF is key derivation function and GPS is a group pre-shared secret. The CSA temporarily holds TTag_U for future computation, however after computing TTagEnc_EV, the former should be discarded from the memory. Upon generating the EV user token (Tok_U), it is supplied to the MD of the EV user, which is securely stored. During the bootstrapping process, the EV sends a request along with LTCert to the EVSE, which is forwarded to the EMSP through the EVSE CC. It should be noted that the issuing CA issues STCert upon valid validation of LTCert. Thus the CSA at the core EMSP generates the authorization token (Tok_EV) for the particular EV. A token for EV (Tok_EV) has EVID as the subject and UID as the pair, thus CSA defines CS1_EV that contains {TokID, Iss, EVID, UID, R1, Lifespan_EV(ExpDate-IssDate)}. In the case of the EV, the CSA generates an EV Token_tag_enc (TTagEnc_EV) as XOR(TTag_EV, TTag_U), where TTag_EV is derived as HMAC(SK1, CS1 EV) and SK1 as KDF(R1, GPS). The EV token (Tok_EV) is generated in similar manner as the EV user token and is transmitted to the EV through the CSO entities (i.e. EVSE CC and EVSE). After receiving Tok_EV, the EV securely stores it. It should be noted that the core EMSP securely distributes the group pre-shared secret (GPS) to the participating CSOs during their initial contract signing. With generation and distribution of authorization tokens (i.e. Tok_U, Tok_EV), the method of this embodiment of the invention continues as described in the aforementioned embodiments.

Figure 11C:
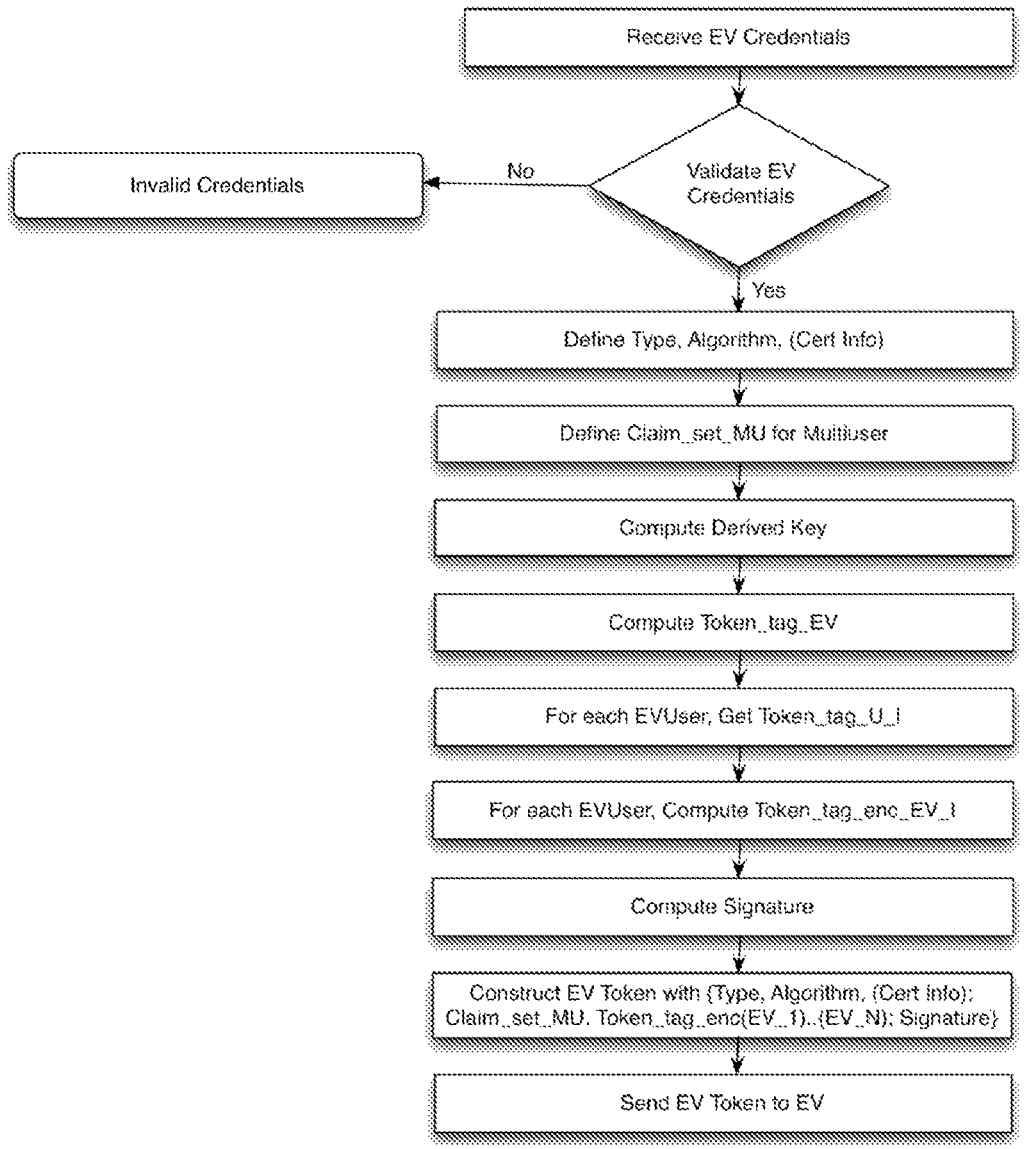
FIG. 11c shows a flowchart for EV token generation involving multi users of the EV.

In some other alternative embodiments, a multiuser scenario is depicted, in which an EV may be owned by two or more legitimate EV owners. When a CAA method is used for a multiple EV users, a number of tokens increases with the number of EV users, for instance, if the number of EV users is n, n tokens have to be stored. Storing large number of tokens in precious memory of the EV may not be desired. In order to eliminate large number of tokens to be stored in the EV, a customized token of the EV for multiusers can be constructed such that only one specific EV token is required to store in the EV for all the EV users. FIG. 10b shows a data format for a token of an embodiment of the invention involving multi users, and FIG. 11c depicts a flowchart for EV token generation involving multi users of the EV.

In yet one more embodiment, among the multiple of the EV users, one, who is driving the EV, needs to recharge it, so his/her MD sends {Tok_U, AT_U} for CAA validation process. And the plugged-in EV also sends {Tok_EV, AT_EV} for CAA validation process. Upon valid entity authentication of both participating entities, the EVSE CC finds the appropriate Pair field in Tok_EV by comparing with Subject field in Tok_U_i in order to determine appropriate TTagEnc_EV_i. With computed TTag_EV, the VA at the EVSE CC performs the APB validation process. It will be true if TTag_U is derived from the Tok_U_i of that particular EV user to use during the APB validation process. The remaining process is the same as described in the aforementioned embodiments.

According yet one more embodiment, the token for multiuser is modified to accommodate more than one pair and respective Token_tag_enc(s). Thus, during the token generation, the CSA at the core EMSP temporarily holds TTag_U_i for each Tok_U_i in order to apply during computation of a corresponding TTagEnc_i. In doing so, the EV token for the multiuser has multiples of Pair fields and corresponding TTagEnc fields. The remaining process is the same as described in the aforementioned embodiments.

In one or more embodiments of the invention, the CAA with CSO validation authority (VA) procedure is deployed, which may be efficient and highly secure for charging and discharging EVs such that only legitimate CSO would be able to perform the APB using the group pre-shared secret (GPS) assigned by the EMSP.

Several disclosed embodiments incorporate the conjugated authentication and authorization (CAA) with local EMSP (L-EMSP) validation authority (VA), where distributed L-EMSPs can validate authentication and authorization process. The CAA with L-EMSP VA procedure overcomes some weaknesses of the CAA with CSO VA procedure. While constructing the APB, asymmetric cryptography (i.e. private-public key pair) is employed. Since the private key is known to the particular entity only, it can mitigate various cyber-attacks such as rogue CSO and the inside attack.

The CAA with L-EMSP VA procedure has a distinct advantage when the EV user prefers to perform charging or discharging activities using subscription-based accounts with the EMSP, since the CAA explicitly provides comprehensive authentication and authorization of both the participating entities (i.e. EV and EV user), thus, the financial validation would not be necessary during charging operation 10a.

In one more embodiment, when an EV user desires to charge or recharge his/her EV, only after valid CAA method, he/she shall be able to perform EV charging. During this process, the EV user shall choose proper settings (i.e. L-EMSP, mode of payment) in the mobile application. Similar to the CAA with CSO VA procedure, for every request to the L-EMSP, the MD submits the valid {Tok_U} along with {AT_U}. Upon receiving {UID, Tok_U, AT_U}, the VA at the L-EMSP validates the authenticity, integrity and non-repudiation of the EV user as well as verifies authenticity and integrity of the given token. The EV is also plugged in to the public charging station outlet, i.e. EVSE, the EV sends Charge request along with {EVID, AT_EV} to the EVSE, which in turn, forwards it towards the L-EMSP through the EVSE CC. If the received AT_EV is valid, then the VA of the L-MSP performs the APB validation. If the EV user has chosen the mode of payment as subscription-based account with EMSP, then after the legitimate APB validation, the L-EMSP can immediately send a Ready_to_charge message to the MD. The remaining process is the same as in the CAA with CSO VA procedure described above.

FIGS. 13a and 13b show call flow diagrams for a validation process of Conjugated Authentication and Authorization (CAA) with CSO VA, and a validation process of CAA with L-EMSP VA respectively.

According to yet one more embodiment, a fundamental difference between the CAA with CSO VA and the CAA with L-EMSP VA is the computation of the derived keys (i.e. SK, SK1). During the token generation phase, the CSA at the core EMSP computes a derived key (SK) for the EV user as KDF(R, x_EMSP.X_U), where x_EMSP is the private key of the EMSP and X_U is the public key of EV user. The SK is used to compute TTag_U for the EV user. The derived key (SK1) for the EV is computed as follows: KDF(R1, x_EMSP.X_EV), where x_EMSP is the private key of the EMSP and X_EV is the public key of EV. The SK1 is used to compute TTag_EV for the EV. The remaining process is the same as in the CAA with CSO VA procedure as described above.

Figure 9B:
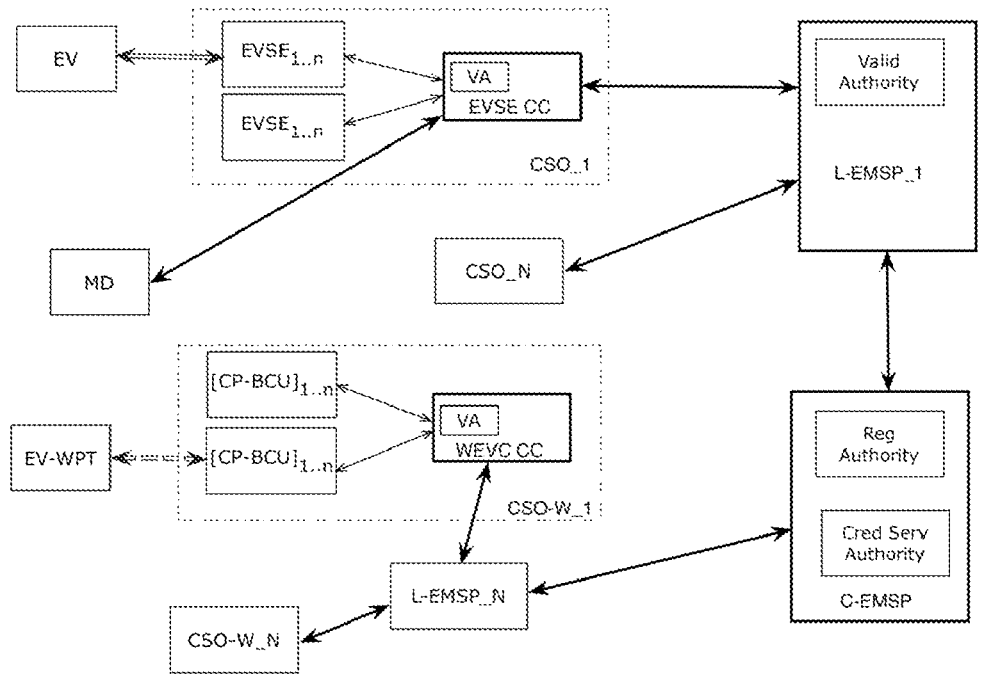
FIG. 9b illustrates a block diagram of a heterogeneous electric vehicle charging system combining both wired and wireless charging capacities for managing and controlling the charging process.

Correspondingly, the above-mentioned embodiments of the CAA procedures for the conventional plug-in EV charging may be applied for wireless EV charging. Some slight modifications may be needed to accommodate the nature of the wireless charging. For instance, the electric vehicle with wireless power transfer (EV-WPT) shall communicate with the base controller unit (BCU) for the CAA process before getting charged at the corresponding charging pad (CP). FIG. 9b illustrates a block diagram of a heterogeneous electric vehicle charging system combining both wired and wireless charging capacities for managing and controlling the charging process.

It is understood that methods and systems of the embodiments of the invention are not limited to electric vehicles and may be also applied to other entities/objects, other than electric vehicles, for performing conjugated authentication and authorization of the other entities/objects.

Internet of Things (IoT), which is rapidly emerging paradigm, allows integration of various smart objects. However, interactions among these smart objects may be susceptible to interception from malicious entities or intruders, thus, robust authentication and authorization mechanisms have to be deployed. The methods and systems of the embodiments of the invention may be deployed in many IoT applications for binding two or more entities and authenticating and authorizing them for the proper access.

With the rise in adaption of mobile cloud computing, complexity of identity management has also increased. And authentication and authorization have become challenging issues in mobile cloud computing. In order to achieve efficient and strong authentication and authorization in the mobile cloud computing, the methods of the embodiments of the invention may be applied.

Methods of the embodiment of the invention are performed using one or more hardware processors, executing processor-executable instructions causing the hardware processors to implement the processes described above. Computer executable instructions may be stored in processor-readable storage media such as floppy disks, hard disks, optical disks, Flash ROMS, non-volatile ROM, and RAM. A variety of processors, such as microprocessors, digital signal processors, and gate arrays, may be employed.

Systems of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the techniques of this disclosure.

It should be noted that methods and systems of the embodiments of the invention and data streams described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method for authorizing a service transaction comprising:
    employing at least one hardware processor for receiving at a service provider:
    an identification data of a first entity;
    an identification data of a second entity;
    a reflexive data obtained from applying a reflexive function to the identification data of the first and second entities;
    at least one of the reflexive data and identification data of the first and second entities being received from the first entity, and the remaining one or more of the reflexive data and identification data of the first and second entities being received from the second entity;
    identifying from which entity the reflexive data has been received;
    applying the reflexive function to the reflexive data and to the identification data received from the other entity from which the reflexive data has not been received, to obtain a valuation data for the entity from which the reflexive data has been received to determine if the first and second entities are associated;
    comparing the valuation data with the identification data of the entity from which the reflexive data has been received; and
    authorizing the service transaction, provided the valuation data and the identification data for the entity from which the reflexive data has been received are the same, thereby verifying the first and second entities are associated and enhancing security of the service transaction.

2. The method of claim 1, further comprising a registration stage performed prior to the authorizing the service transaction, the registration stage comprising:
    at the service provider, having at least one memory device:
    receiving the identification data of the first entity;
    receiving the identification data of the second entity;
    applying the reflexive function to the identification data of the first and second entities to produce the reflexive data; and
    providing at least one of the reflexive data and identification data of the first and second entities to the first entity, and providing the remaining one or more of the reflexive data and identification data of the first and second entities to the second entity.

3. The method of claim 2, further comprising deleting the identification data of the first and second entities and the reflexive data from the at least one memory device.

4. The method of claim 1, wherein the applying the reflexive function comprises applying a function possessing the following properties:
if $f(x\_1, x\_2, \ldots, x\_{i-1}, x\_i, x\_{i+1}, \ldots x\_n)=y$, then $f(x\_1, x\_2, \ldots, x\_{i-1}, y, x\_{i+1}, \ldots, x\_n)=x\_i$.

5. The method of claim 1, wherein:
    the receiving the identification data for the first entity comprises receiving a first pair of conjugated data containing the identification information for the first entity and the second entity; and
    the receiving the identification data for the second entity comprises receiving a second pair of conjugated data containing the identification information for the second entity and the first entity.

6. The method of claim 5, further comprises applying a cryptographic function to the first and second pairs to generate respective token tags for the first and second entities, and wherein the reflexive data is obtained from applying the reflexive function to the respective token tags for the first and second entities.

7. The method of claim 6, wherein:
the first entity is a device of a user;
the second entity is an electric vehicle associated with the user; and
the reflexive data is stored in a storage element of the electric vehicle.

8. The method of claim 1, wherein:
the first entity is a user-controlled device;
the second entity is an electric vehicle associated with the user;
the reflexive data is stored in a storage element of the electric vehicle;
the identification data of the first and second entities comprises a pair of conjugated data containing the identification information for the first entity and the second entity; and
the service transaction comprises charging the electric vehicle.

9. The method of claim 6, wherein the cryptographic function is selected from a group consisting of:
a hashing function, a message authentication code (MAC) function, and a keyed MAC function.

10. The method of claim 5, further comprising generating respective first and second credentials for the first and second entities for communicating with the service provider, comprising respective encrypted first and second token tags.

11. A server for authorizing a service transaction comprising:
a memory device having computer readable instructions stored thereon for execution by a processor, causing the processor to:
receive:
an identification data of a first entity;
an identification data of a second entity;
a reflexive data obtained from applying a reflexive function to the identification data of the first and second entities;
at least one of the reflexive data and identification data of the first and second entities being received from the first entity, and the remaining one or more of the reflexive data and identification data of the first and second entities being received from the second entity;
identify from which entity the reflexive data has been received;
apply the reflexive function to the reflexive data and to the identification data received from the other entity from which the reflexive data has not been received, to obtain a valuation data for the entity from which the reflexive data has been received to determine if the first and second entities are associated;
compare the valuation data with the identification data of the entity from which the reflexive data has been received; and
authorize the service transaction, provided the valuation data and the identification data for the entity from which the reflexive data has been received are the same, thereby verifying the first and second entities are associated and enhancing security of the service transaction.

12. The server of claim 11, wherein the computer readable instructions further cause the processor to perform a registration stage prior to the authorizing the service transaction, the registration stage comprising:
receiving the identification data of the first entity;
receiving the identification data of the second entity;
applying the reflexive function to the identification data of the first and second entities to produce the reflexive data;
providing at least one of the reflexive data and identification data of the first and second entities to the first entity, and providing the remaining one or more of the reflexive data and identification data of the first and second entities to the second entity; and
deleting the identification data of the first and second entities and the reflexive data from the memory device.

13. The server of claim 11, wherein computer readable instructions further cause the processor to:
apply a hashing function to the identification data of the first entity to produce a first token;
apply the hashing function to the identification data of the second entity to produce a second token; and
apply an exclusive OR function to the first and second tokens to produce the reflexive data.

14. The server of claim 11, wherein the computer readable instructions further cause the processor to identify one option, from a group of options consisting of, whether:
the identification data of the device of the user has been received from the device of the user, and the identification data of the electric vehicle and the reflexive data have been received from the electric vehicle;
the identification data of the device of the user and the reflexive data have been received from the device of the user, and the identification data of the electric vehicle has been received from the electric vehicle;
the identification data of the device of the user and the identification data of the electric vehicle have been received from the device of the user, and the reflexive data has been received from the electric vehicle;
the identification data of the device of the user and the reflexive data have been received from the device of the user, and the identification data of the electric vehicle has been received from the electric vehicle;
the identification data of the electric vehicle has been received from the device of the user, and identification data of the device of the user and the reflexive data have been received from the electric vehicle; and
the identification data of the electric vehicle and the reflexive data have been received from the device of the user, and the identification data of the device of the user has been received from the electric vehicle.

15. A charging station for receiving an authorization instruction for charging an electric vehicle associated with a user, the charging station comprising:
a processor, and a memory having computer readable instructions stored thereon for execution by a processor, causing the processor to:
receive:
in identification data of a device of the user;
an identification data of the electric vehicle;
a reflexive data obtained from applying a reflexive function to the identification data of the device of the user and the electric vehicle;
at least one of the reflexive data and identification data of the device of the user and the electric vehicle being received from the device of the user, and the remaining one or more of the reflexive data and identification data of the device of the user and the electric vehicle being received from the electric vehicle; and receive the authorization instruction for charging the electric vehicle in response to the server computer:
- identifying an entity from which the reflexive data has been received, comprising identifying whether the reflexive data has been received from the device of the user or the electric vehicle;
- applying the reflexive function to the reflexive data and to the identification data received from the other entity from which the reflexive data has not been received, to obtain a valuation data for the entity from which the reflexive data has been received to determine if the device of the user and the electric vehicle are associated;
- comparing the valuation data with the identification data of the entity from which the reflexive data has been received; and
- generating the authorization instruction, provided the valuation data and the identification data for the entity from which the reflexive data has been received are the same, thereby verifying the device of the user and the electric vehicle are associated and enhancing security of the authorization instruction.

16. The charging station of claim 15, wherein the computer readable instructions further cause the processor to identify one option, from a group of options consisting of, whether:
- the identification data of the device of the user has been received from the device of the user, and the identification data of the electric vehicle and the reflexive data have been received from the electric vehicle; and
- the identification data of the device of the user and the reflexive data have been received from the device of the user, and the identification data of the electric vehicle has been received from the electric vehicle.

17. The charging station of claim 16, wherein the computer readable instructions further cause the processor to identify one option, from a group of options consisting of, whether:
- the identification data of the device of the user and the identification data of the electric vehicle have been received from the device of the user, and the reflexive data has been received from the electric vehicle; and
- the identification data of the device of the user and the reflexive data have been received from the device of the user, and the identification data of the electric vehicle has been received from the electric vehicle.

18. The charging station of claim 15, wherein the computer readable instructions further cause the processor to identify one option, from a group of options consisting of, whether:
- the identification data of the electric vehicle has been received from the device of the user, and identification data of the device of the user and the reflexive data have been received from the electric vehicle; and
- the identification data of the electric vehicle and the reflexive data have been received from the device of the user, and the identification data of the device of the user has been received from the electric vehicle.

19. The charging station of claim 15, wherein the reflexive function possesses the following properties:
if $f(x\_1, x\_2, \ldots, x\_{i-1}, x\_i, x\_{i+1}, \ldots x\_n)=y$, then $f(x\_1, x\_2, \ldots, x\_{i-1}, y, x\_{i+1}, \ldots, x\_n)=x\_i$.

20. The charging station of claim 19, wherein the reflexive function comprises an exclusive OR operation, XOR.

* * * * *